United States Patent
Tanabe et al.

(10) Patent No.: US 10,805,399 B2
(45) Date of Patent: Oct. 13, 2020

(54) DATA SERVER UNIT AND COMMUNICATION SYSTEM INCLUDING MASTER-SLAVE MANAGEMENT CIRCUITRY

(71) Applicant: Mitsubishi Electric Corporation, Tokyo (JP)

(72) Inventors: Satoshi Tanabe, Tokyo (JP); Osamu Nasu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/466,292

(22) PCT Filed: Apr. 18, 2017

(86) PCT No.: PCT/JP2017/015609
§ 371 (c)(1),
(2) Date: Jun. 3, 2019

(87) PCT Pub. No.: WO2018/193525
PCT Pub. Date: Oct. 25, 2018

(65) Prior Publication Data
US 2019/0342396 A1 Nov. 7, 2019

(51) Int. Cl.
*H04L 29/08* (2006.01)
*G05B 15/02* (2006.01)
(Continued)

(52) U.S. Cl.
CPC ............ *H04L 67/12* (2013.01); *G05B 15/02* (2013.01); *G06F 13/362* (2013.01);
(Continued)

(58) Field of Classification Search
CPC . H04L 2012/40208; H04L 2012/40215; H04L 2012/40221; H04L 2012/40228;
(Continued)

(56) References Cited

U.S. PATENT DOCUMENTS

| 6,792,337 B2 * | 9/2004 | Blackett ................ G01D 4/00 700/286 |
| 7,023,795 B1 * | 4/2006 | Hwu ................ H04L 43/0811 370/219 |

(Continued)

FOREIGN PATENT DOCUMENTS

| JP | 2002-341906 A | 11/2002 |
| JP | 2005-50127 A | 2/2005 |

(Continued)

OTHER PUBLICATIONS

Siemens Corporation. "SIMATIC NET: Industrial Communication with PG/PC Manual", Nov. 2003, 698 pages. (Year: 2003).*

(Continued)

*Primary Examiner* — George C Neurauter, Jr.
(74) *Attorney, Agent, or Firm* — Xsensus LLP

(57) ABSTRACT

A data server includes a controller, a memory that stores first information collected from devices, and master-slave management circuitry that sets whether the data server operates according to one of a master function for managing a data server and a slave function for being managed by the data server. In a case where the master function is set by the master-slave management circuitry, the controller sends to an external client, in response to receiving a data collection request from the external client, information corresponding to the data collection request that is one of data stored in the memory and data received from the other data server. In a case where the slave function is set by the master-slave management circuitry, the controller sends the first information to the other data server in which the master function is set.

11 Claims, 11 Drawing Sheets

(51) Int. Cl.
*G06F 13/362* (2006.01)
*H04L 12/40* (2006.01)

(52) U.S. Cl.
CPC .. *H04L 12/40019* (2013.01); *H04L 12/40195* (2013.01); *H04L 2012/40208* (2013.01)

(58) Field of Classification Search
CPC ......... H04L 12/40019; H04L 12/40195; H04L 67/12; G05B 15/02; G06F 13/362
See application file for complete search history.

(56) References Cited

U.S. PATENT DOCUMENTS

| | | | | |
|---|---|---|---|---|
| 7,451,215 | B2* | 11/2008 | Hawkinson | H04L 29/06 709/203 |
| 7,486,495 | B1* | 2/2009 | Diederichs | G05B 19/4185 340/870.07 |
| 7,496,668 | B2* | 2/2009 | Hawkinson | H04L 29/06 709/202 |
| 7,792,594 | B2* | 9/2010 | Humpert | G05B 19/058 340/508 |
| 8,132,042 | B2* | 3/2012 | Jordan | H04L 69/40 714/4.1 |
| 8,886,786 | B2* | 11/2014 | Hahniche | G05B 19/4184 700/79 |
| 9,316,521 | B2* | 4/2016 | De Groot | G01F 23/0076 |
| 9,736,020 | B2* | 8/2017 | Cho | H04L 41/0816 |
| 9,876,653 | B1* | 1/2018 | Stamatakis | F24F 11/50 |
| 10,372,095 | B2* | 8/2019 | Heutger | G05B 15/02 |
| 2004/0024891 | A1* | 2/2004 | Agrusa | G05B 19/4185 709/230 |
| 2005/0028024 | A1 | 2/2005 | Kataoka et al. | |
| 2006/0056285 | A1* | 3/2006 | Krajewski, III | G05B 9/03 370/216 |
| 2007/0198724 | A1* | 8/2007 | Hawkinson | H04L 29/06 709/226 |
| 2009/0013082 | A1 | 1/2009 | Nara | |
| 2010/0030935 | A1* | 2/2010 | Hafer | G06F 13/4286 710/105 |
| 2010/0205340 | A1* | 8/2010 | Wei | H04L 12/413 710/110 |
| 2011/0106321 | A1 | 5/2011 | Cherian et al. | |
| 2013/0204450 | A1* | 8/2013 | Kagan | H04L 67/06 700/291 |
| 2015/0156286 | A1* | 6/2015 | Blair | H04L 12/4625 709/201 |
| 2017/0357253 | A1* | 12/2017 | Kilpatrick | G05B 23/0264 |

FOREIGN PATENT DOCUMENTS

| | | |
|---|---|---|
| JP | 2006-72407 A | 3/2006 |
| JP | 2006-190202 A | 7/2006 |
| JP | 2008-77535 A | 4/2008 |
| JP | 2013-510545 A | 3/2013 |
| JP | 2015-141644 A | 8/2015 |

OTHER PUBLICATIONS

Li Guoxin et al. "Application of OPC to Realize the Communications between WinCC and Master-slave PLC in the PROFIBUS Network", 2015 IEEE Fifth International Conference on Big Data and Cloud Computing, 4 pages. (Year: 2015).*

International Search Report and Written Opinion dated Jul. 18, 2017 for PCT/JP2017/015609 filed on Apr. 18, 2017, 9 pages including English Translation of the International Search Report.

Decision to Grant a Patent received for Japanese Patent Application No. 2018-511776, dated Mar. 27, 2018, 5 pages including English Translation.

* cited by examiner

DATA SERVER UNIT AND COMMUNICATION SYSTEM INCLUDING MASTER-SLAVE MANAGEMENT CIRCUITRY

CROSS-REFERENCE TO RELATED APPLICATIONS

The present application is based on PCT filing PCT/JP2017/015609, filed Apr. 18, 2017, which is incorporated herein by reference.

FIELD

The present invention relates to a data server unit and a communication system that collect information.

BACKGROUND

In a control system used in the field of factory automation (FA) for automating the factory production process, a data server unit (hereinafter simply referred to as a data server), which is an FA controller, collects data about the production equipment from devices such as sensors and robots. In the control system, a plurality of data servers can exist, and a client, which is a computer, connects to the data server that collects desired data, whereby the client collects information about the desired device via the data server.

Patent Literature 1 discloses that a client operates, via a data server (corresponding to a field server), a device (corresponding to a field device) connected to the data server, and the device voluntarily sends information related to the device to the data server, whereby the data server collects information related to the device.

CITATION LIST

Patent Literature

Patent Literature 1: Japanese Patent Application Laid-open. No. 2008-77535

SUMMARY

Technical Problem

However, Patent Literature 1, the above-mentioned conventional technology, only describes a single data server. If there is a plurality of data servers connected to devices, the client needs to select the data server connected to a desired device and communicate with the selected data server in order to obtain information about the desired device.

The present invention has been made in view of the above, and an object thereof is to obtain a data server unit that enables a client to acquire desired data regardless of which data server the client connects to in a system including a plurality of data servers.

Solution to Problem

In order to solve the above-mentioned problem and achieve the object, the present invention provides a data server unit including: a storage section that stores first information data collected from a first external instrument; a master-slave management section that sets whether the data server unit has a master function for managing an other data server unit or a slave function for being managed by the other data server unit; and a control section that sends, in response to receiving a data collection request from an external client in a case where the master function is set by the master-slave management section, information data corresponding to the data collection request from the storage section or the other data server unit to the client.

Advantageous Effects of Invention

The data server unit according to the present invention can be combined with another data server unit to achieve the effect of sending desired data to the client regardless of which data server unit the client connects to.

DESCRIPTION OF EMBODIMENTS

Hereinafter, a data server unit (hereinafter simply referred to as a data server) and a communication system according to an embodiment of the present invention will be described in detail based on the drawings. The present invention is not limited to the embodiment.

Embodiment

Figure 1:
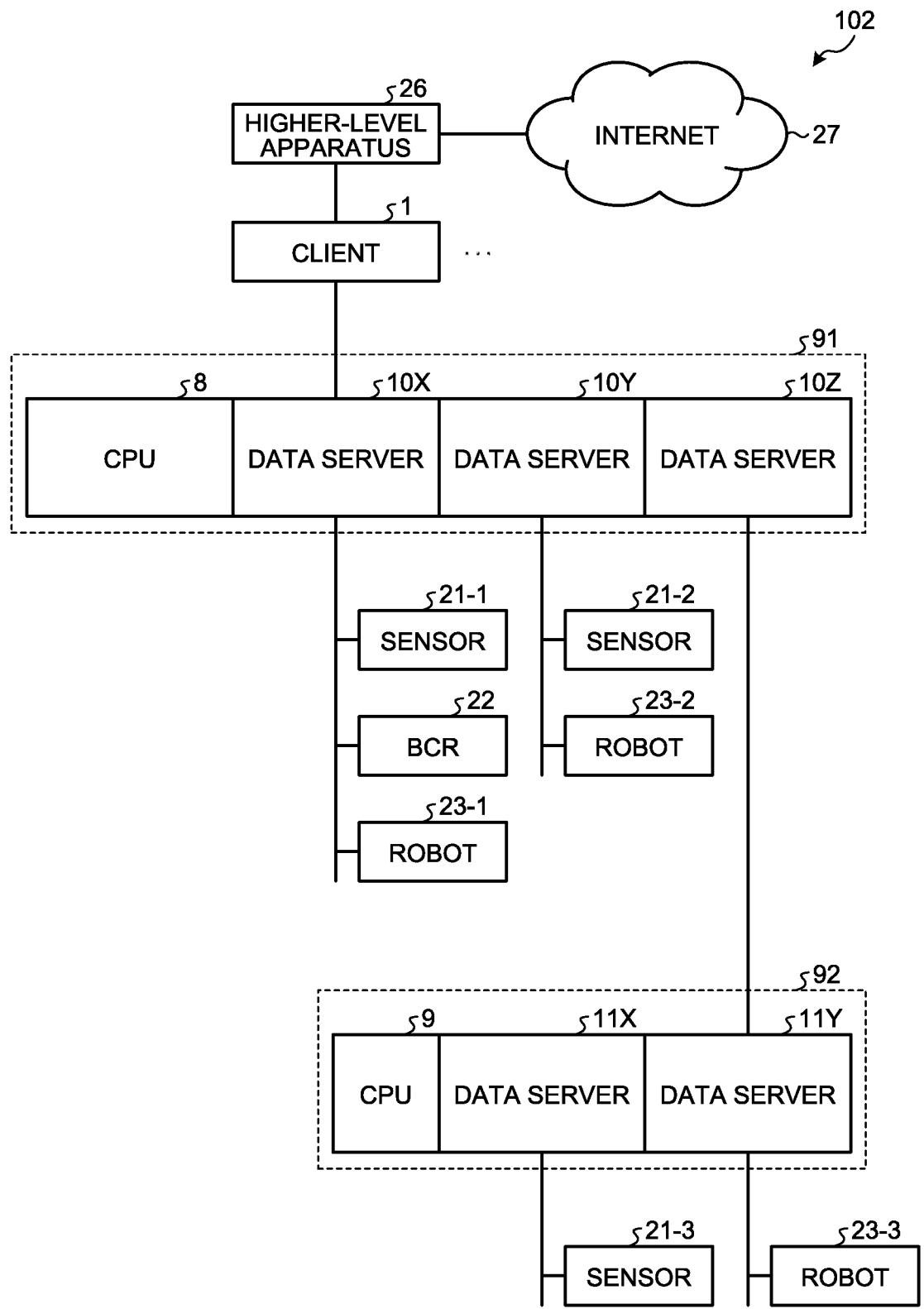
FIG. 1 is a diagram illustrating a configuration of a communication system including data server units according to an embodiment.

First, an exemplary configuration of a communication system to which a data server according to the embodiment is applied will be described. FIG. 1 is a diagram illustrating a configuration of a communication system including data servers according to the embodiment.

The communication system 102 includes one or more clients 1, i.e. host apparatuses, a programmable logic controller (PLC) system 91 connected to the client 1, a PLC system 92 connected to the PLC system. 91, and a higher-level apparatus 26 connected to the client 1.

The higher-level apparatus 26 is a computer on a higher level than the client 1 and is connected to the Internet 27. The higher-level apparatus 26 is connected to a plurality of clients including the client 1, and collects information data (hereinafter simply referred to as information) from the plurality of clients. Note that the higher-level apparatus 26 may be connected to a network other than the Internet 27, or may further be connected to another higher-level apparatus. Alternatively, the client 1 may be connected to the Internet 27, or the PLC system 91 may be connected to the client 1 via the Internet 27. Although the higher-level apparatus 26 is provided in the present embodiment, the higher-level apparatus 26 may not be provided.

The client 1 is connected to the higher-level apparatus 26, and operates in accordance with instruction data (hereinafter simply referred to as an instruction) from the higher-level apparatus 26. Note that the client 1 may operate in accordance with an instruction from the user. The client 1 is a computer that collects information from the PLC systems 91 and 92 connected on lower levels than the client 1. The client 1 is a higher-level information processing apparatus connected on a higher level than the PLC systems 91 and 92. The client 1 may be supervisory control and data acquisition (SCADA) or a computer applied to enterprise resource planning (ERP) for a backbone information system. SCADA is an industrial control system that performs system monitoring and process control using computers. SCADA is also called a data collection and monitoring control system.

The PLC systems 91 and 92 are configured such that a plurality of PLCs can be arranged therein. A PLC is an FA controller for controlling various instruments using to a ladder language specialized for machine control. Here, the PLC system 91 includes a central processing unit (CPU) 8 which is a PLC and data servers 10X, 10Y, and 10Z which are PLCs. In a case where the PLC system 91 includes a base unit having the function of data transfer between units, the CPU 8 and the data servers 10X, 10Y, and 10Z are connected to the base unit. The PLC system 92 includes a CPU 9 which a PLC and data servers 11X and 11Y which are PLCs. In a case where the PLC system 92 includes a base unit, the CPU 9 and the data servers 11X and 11Y are connected to the base unit.

The CPU 8 is a unit arranged in the PLC system 91 to control the data servers 10X, 10Y, and 10Z arranged in the PLC system 91. The CPU 9 is a unit arranged in the PLC system 92 to control the data servers 11X and 11Y arranged in the PLC system 92.

The data servers 10X to 10Z, 11X, and 11Y, which are examples of intelligent functional units capable of advanced information processing, are data server apparatuses used in the field of FA. FA is also called factory automation. The data servers 10X to 10Z, 11X, and 11Y are units for controlling devices connected on lower levels and collecting device information about devices connected on lower levels. An example of device information is the location of the device, the state of the device, the environment in which the device is placed, or a detection value detected by the device. The devices connected to the data servers 10X to 10Z, 11X, and 11Y are field devices arranged in the factory.

The PLC system 91 includes a bus B1 (described later). The CPU 8 and the data servers 10X to 10Z are arranged in the PLC system 91, so that the CPU 8 and the data servers 10X to 10Z are connected to the bus B1. The bus B1 is a communication path connecting the CPU 8 and the data servers 10X to 10Z, which are PLCs, to an input/output module (not illustrated). Note that the PLC system 91 may include intelligent functional units other than the data servers 10X to 10Z. Intelligent functional units are expansion modules connectable to the bus B1.

The PLC system 92 includes a bus (not illustrated). The CPU 9, the data server 11X, and the data server 11Y are connected to the bus. Note that the PLC system 92 may include intelligent functional units other than the data servers 11X and 11Y.

The data server 10X is connected to the client 1, a sensor 21-1 which is a device, a barcode reader (BCR) 22 which is a device, an d a robot 23-1 which is a device. The sensor 21-1 measures the state in the factory and sends the result of measurement to the data server 10X. The BCR 22 reads a barcode in the factory and sends the result of reading to the data server 10X. The robot 23-1 operates in accordance with an instruction from the data server 10X.

The data server 10Y is connected to a sensor 21-2 which is a device and a robot 23-2 which is a device. The sensor 21-2 is a sensor similar to the sensor 21-1, and sends the result of measurement to the data server 10Y. The robot 23-2 operates in accordance with an instruction from the data server 10Y.

The data server 10Z is connected to the data server 11Y of the PLC system 92 and collects PLC intrasystem information, i.e. information stored in the PLC system 92. PLC intrasystem information is information collected by the units in the PLC system 92, and may be information about the units in the PLC system 92 or device information about the devices connected to the PLC system 92.

The data server 11X is connected to a sensor 21-3 which is a device. The sensor 21-3 is a sensor similar to the sensor 21-1, and sends the result of measurement to the data server 11X. The data server 11Y is connected to a robot 23-3 which is a device. The robot 23-3 operates in accordance with an instruction from the data server 11Y.

The client 1 performs data communication with the data server 10X in accordance with object linking and embedding (OLE) for process control (OPC) unified architecture (UA) which is a normal communication standard. In other words, the client 1 operates in accordance with the format specified by OPC UA. In addition, the data server 10X performs data communication with the client 1 in accordance with OPC UA, and performs data communication with the CPU 8 and the data servers 10Y and 10Z in accordance with OPC UA. Therefore, the data servers 10X to 10Z are OPC UA servers.

In the embodiment, the data servers 10X to 10Z collect device information, i.e. first information of the devices connected on a lower level. The data servers 10X to 10Z are connected to the same bus B1 so that data communication is performed between the data servers 10X to 10Z. Consequently, one unit representative of the data servers 10X to 10Z collects device information, i.e. second information collected by the data servers other than the representative unit, from the other data servers. The representative unit is a master data server (described later), and the other units are slave data servers. The master data server which is the representative unit sends device information to the client 1 in response to a request from the client 1.

As described above, since the data servers 10X to 10Z perform data communication in cooperation with one another, the client 1 can operate as if it accessed a single data server without being conscious of the presence of the plurality of data servers 10X to 10Z. Therefore, in the embodiment, the client 1 can request device information without being conscious of the storage location of the device information. Consequently, the client 1 can realize seamless access and scalability, in which the client 1 appears to be connected to one data server.

Note that the data server 10X may perform data communication with the client 1 in accordance with a communication scheme other than OPC UA, or perform data communication with the CPU 8 and the data servers 10Y and 10Z in accordance with a communication scheme other than OPC UA.

In the following description, the client 1 and the data server 10X execute data communication in accordance with OPC UA between the client 1 and the data server 10X, and each unit within the PLC system 91 executes inter-unit data communication in accordance with a data communication scheme other than OPC UA. An example of a data communication scheme other than OPC UA is OPC-based data communication or data communication that uses Ethernet (registered trademark).

In the case depicted in FIG. 1, the two layers of PLC systems 91 and 92 are arranged in the communication system 102. Alternatively, one or three layers of PLC systems may be arranged in the communication system 102.

The communication system 102 is an example of a communication system to which the data servers 10X to 10Z, 11X, and 11Y according to the embodiment are applied, and the data servers 10X to 10Z, 11X, and 11Y may be applied to another communication system.

Figure 2:
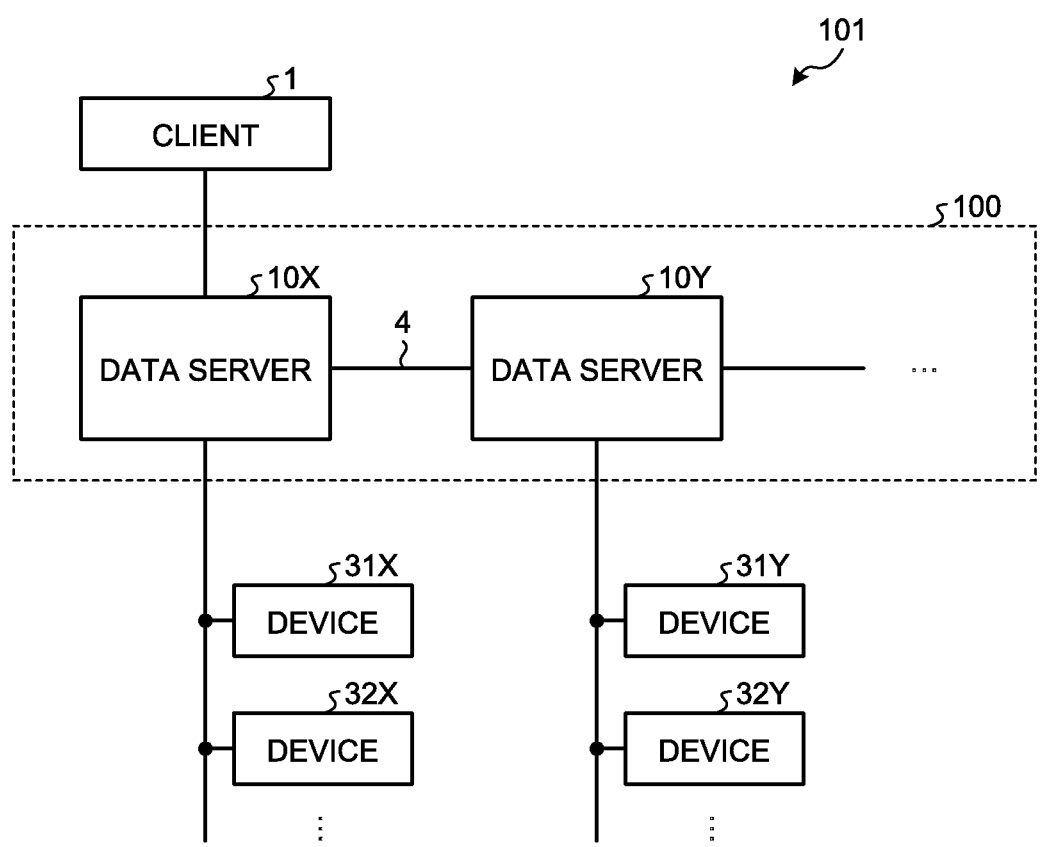
FIG. 2 is diagram illustrating a configuration of a server system according to the embodiment.

FIG. 2 is a diagram illustrating a configuration of a server system according to the embodiment. The server system 101 is a part of the communication system 102 and includes a data server group 100 including a plurality of data servers. FIG. 2 illustrates a case where the data server group 100 includes the data server 10X which is a first data server and the data server 10Y which is a second data server. Note that the data server group 100 may include the data server 10Z. FIG. 2 also illustrates a case where the data server 10X is connected to devices 31X and 32X which are field devices and the data server 10Y is connected to devices 31Y and 32Y which are field devices. The server system 101 is applied to an industrial system such as a production system.

In the case depicted in FIG. 1, the data servers 10X and 10Y are connected to the same bus. In contrast, in the case depicted in FIG. 2, the data servers 10X and 10Y are connected by an individual communication line 4 other than the bus.

The devices 31X and 32X which are first devices are first external instruments such as the sensor 21-1, the BCR 22, or the robot 23-1 described above. The devices 31Y and 32Y which are second devices are second external instruments such as the sensor 21-2 or the robot 23-2 described above.

The data server 10X is connected to the data server 10Y via the communication line 4. Then, the data server 10X and the data server 10Y perform data communication between the data servers 10X and 10Y via the communication line 4. The data server 10X accesses the devices 31X and 32X to collect and store the device information of the devices 31X and 32X as first device information from the devices 31X and 32. The data server 10Y accesses the devices 31Y and 32Y to collect and store the device information of the devices 31Y and 32Y as second device information from the devices 31Y and 32Y.

In the server system 101, either the data server 10X or the data server 10Y serves as a master data server that responds to a data collection request from the client 1, and the other serves as a slave data server that provides device information to the master data server.

The data servers 10X and 10Y store master-slave information indicating which of the data servers 10X and 10Y is the master data server and which is the slave data server. Upon receiving a data collection request, i.e. a request for device information, from the client 1, the master data server determines whether the data collection request is a request directed to the master data server or a request directed to the slave data server. In the embodiment, in response to a data collection request from the client 1, the master data server collects data and sends the data to the client 1.

Specifically, upon receiving a data collection request directed to the master data server, the master data server collects device information from the devices connected to the master data server and sends the device information to the client 1. On the other hand, upon receiving a data collection request directed to the slave data server, the master data server causes the slave data server to collect data. Consequently, the slave data server collects device information from the devices connected to the slave data server and sends the device information to the master data server. The master data server then sends the device information collected from the slave data server to the client 1. In addition, upon receiving a data collection request from the client 1, the slave data server transfers the data collection request to the master data server.

In this way, the server system 101 performs transmission and reception of device information between the data servers 10X and 10Y. In response to a data collection request from the client 1 to either the data server 10X or the data server 10Y, the master data server collects device information and sends the device information to the client 1.

Figure 3:
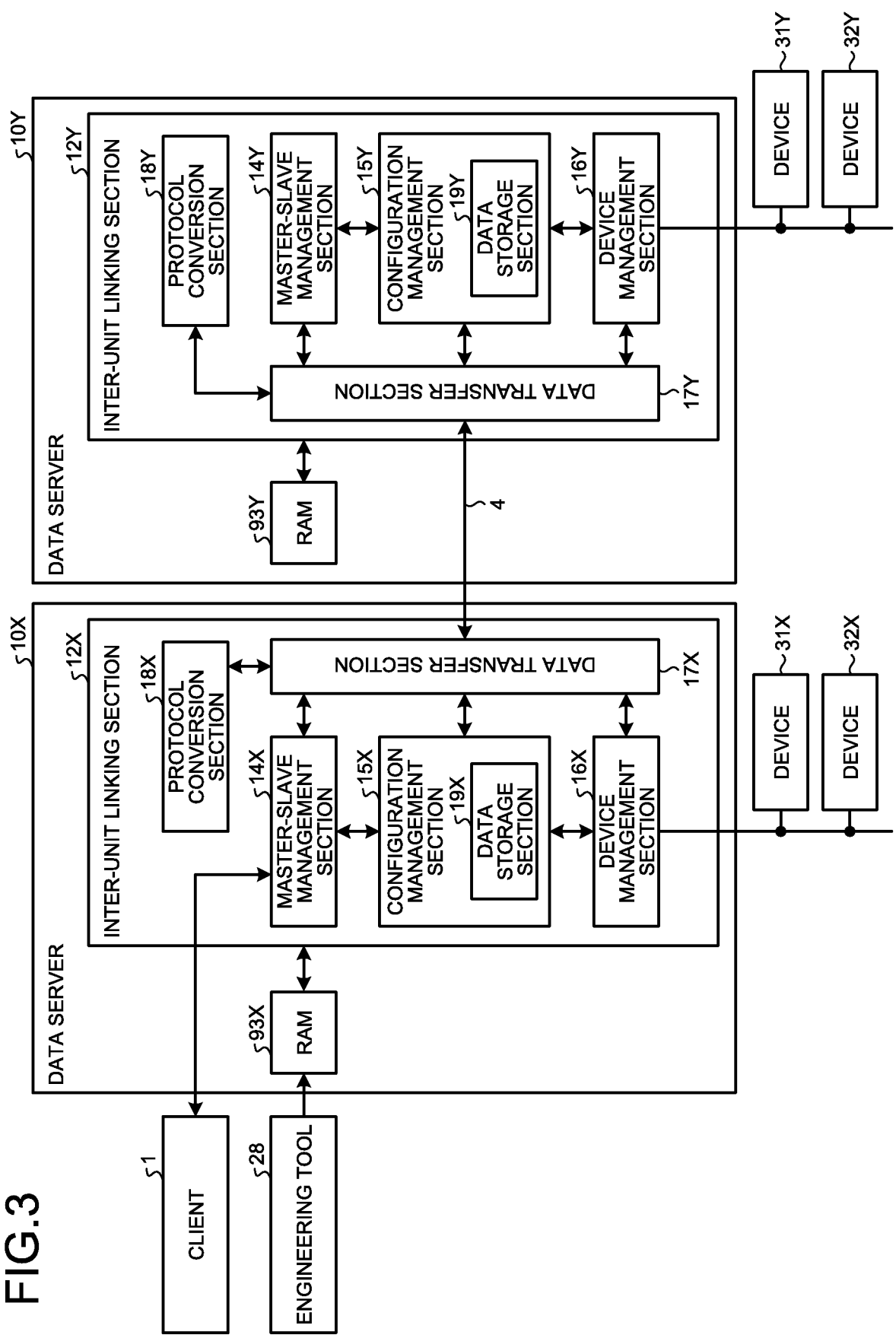
FIG. 3 is a diagram illustrating a configuration of the data server units according to the embodiment.

FIG. 3 is a diagram illustrating a configuration of the data servers according to the embodiment. Although the two data servers 10X and 10Y are described here, three or more data servers may be used. Either the data server 10X or the data server 10Y is set as the master data server, and the other is set as the slave data server. In a case where three or more data servers are connected, one data server is set as the master data server, and the remaining data servers are set as slave data servers.

In the explanation of FIGS. 3 to 7, the data server connected to the client 1 is the data server 10X, and the data server connected to the data server 10X without being connected to the client 1 is the data server 10Y.

The data server 10X is configured to be connectable to the client 1 and an engineering tool 28. FIG. 3 illustrates a case where the data server 10X is connected to the client 1 and the engineering tool 28 for setting parameters for the PLCs and the like. Specifically, before the data server 10X operates, the engineering tool 28 is connected to the data server 10X, and while the data server 10X is in operation, the client 1 is connected to the data server 10X.

The engineering tool 28 is a tool stored in a computer which is an external apparatus. Connecting the computer and the data server 10X enables the engineering tool 28 to access the data server 10X. Note that software for executing the operation of the engineering tool 28 may be stored in an external memory. In this case, the external memory is connected to the data server 10X, and the data server 10X executes the software, whereby the engineering tool 28 operates. An exemplary external memory in which the engineering tool 28 is stored is a universal serial bus (USB) memory or a secure digital (SD) card. In the following description, the engineering tool 28 is stored in the computer which is an external apparatus.

The engineering tool 28 accesses the data server 10X before the data servers 10X and 10Y operate, sets either the data server 10X or the data server 10Y as the master data server, and sets the other as the slave data server. The engineering tool 28 may be connected to a random access memory (RAM) 93X of the data server 10X or may be connected to a bus 52 (described later) of the data server 10X.

To the data servers 10X and 10Y, the engineering tool 28 sends an instruction to set the data servers 10X and 10Y as the master data server and the slave data server. In the case of setting the data server 10X as the master data server, the engineering tool 28 sends connection configuration information (described later) to the data server 10X. In this case, the engineering tool 28 sends, to the data server 10X, an instruction to set the data server 10X as the master data server and connection configuration information.

Connection configuration information includes the number of data servers arranged in the data server group 100 and the addresses of the data servers. Here, since the two data servers 10X and 10Y are arranged in the PLC system 91, the connection configuration information includes information indicating "two data servers" and the addresses of the data servers 10X and 10Y. The connection configuration information may further include the connection slot numbers or input/output (IO) numbers of the data servers 10X and 10Y in the PLC system 91.

The connection configuration information further includes information on a first connection relationship indicating which devices the data server 10X is connected to and information on a second connection relationship indicating which devices the data server 10Y is connected to. The information indicating which device the data server 10X is connected to is a list of devices connected on a lower level than the data server 10X such as the devices 31X and 32X. The information indicating which device the data server 10Y is connected to is a list of devices connected on a lower level than the data server 10Y such as the devices 31Y and 32Y. Therefore, in the case of setting the data server 10X as the master data server, the engineering tool 28 sends, to the data server 10X, connection configuration information indicating that the data server 10X is connected to the devices 31X and 32X and that the data server 10Y is connected to the devices 31Y and 32Y.

On the other hand, in the case of setting the data server 10Y as the master data server, the engineering tool 28 sends connection configuration information to the data server 10Y. In this case, the engineering tool 28 sends, to the data server 10Y, an instruction to set the data server 10Y as the master data server and connection configuration information.

The data server 10X includes an inter-unit linking section 12X and a RAM 93X. The inter-unit linking section 12X performs transmission and reception of data between the units. The RAM 93X temporarily stores instructions and information sent from the engineering tool 28.

The data server 10X stores, in the inter-unit linking section 12X, instructions or information directed to the data server 10X from the engineering tool 28. The data server 10X also transfers, to the data server 10Y, instructions or information directed to the data server 10Y from the engineering tool 28.

The inter-unit linking section 12X is configured using an integrated circuit, and is connected to the RAM 93X. The inter-unit linking section 12X includes a master-slave management section 14X, a device management section 16X, and a configuration management section 15X. The master-slave management section 14X manages master-slave information, i.e. information identifying the data server 10X as the master data server or the slave data server. The device management section 16X collects device information from the devices 31X and 32X. The configuration management section 15X stores the device information collected by the device management section 16X.

The inter-unit linking section 12X also includes a data transfer section 17X that sends data to the data server 10Y and receives data from the data server 10Y, and a protocol conversion section 18X that converts a communication protocol when communicating between the data servers 10X and 10Y. The inter-unit linking section 12X is connected to the client 1 via a communication interface 75 (described later).

The data transfer section 17X is connected to the master-slave management section 14X, the device management section 16X, the configuration management section 15X, and the protocol conversion section 18X. The data transfer section 17X is also connected to the data server 10Y.

The RAM 93X is connected to the master-slave management section 14X, the device management section 16X, the configuration management section 15X, the data transfer section 17X, and the protocol conversion section 18X via the bus B2 in the data server 10X.

The master-slave management section 14X can set either a master function for managing the data server 10Y or a slave function for being managed by the data server 10Y. The master-slave management section 14X, which is a master-slave setting section capable of setting the master function and the slave function in this way, sets the data server 10X as the master data server or the slave data server in accordance with an instruction from the engineering tool 28. The master-slave management section 14X sets the data server 10X as the master data server or the slave data server and stores master-slave information.

The master-slave management section 14X is connected to the client 1 via the communication interface 75 (described later), and accepts a data collection request from the client via the communication interface 75. The master-slave management section 14X sends a data collection request from the client 1 to the configuration management section 15X.

In a case where three or more data servers including the data servers 10X and 10Y are connected in the server system 101, the master-slave management section 14X manages the master-slave information of the connected data servers.

The device management section 16X has the function of a collection section that collects device information from the devices 31X and 32X at an arbitrary timing. The timing at which the device management section 16X collects device information from the devices 31X and 32K is, for example, the timing set by the engineering tool 28.

In a case where the data server 10X is the slave data server, the device management section 16X may collect device information from the devices 31X and 32X in response to a data collection request from the data server 10Y serving as the master data server.

Alternatively, in a case where the data server 10X is the master data server, the device management section 16X may collect device information from the devices 31X and 32X in response to a data collection request from the client 1.

In addition, in a case where the data server 10X is the master data server, the device management section 16X may send a data collection request to the slave data server in response to the data collection request from the client 1. Note that the data collection request to the slave data server may be sent by the configuration management section 15X.

The device management section 16X holds a list of devices connected on a lower level than the data server 10X such as the devices 31X and 32X, and collects the device information of the devices stored in the list.

In the case of collecting device information at the timing set by the engineering tool 28, the device management section 16X collects device information transiently or cyclically from the devices 31X and 32X.

In the case of transiently collecting device information, the device management section 16X collects device information from the devices 31X and 32X when an event set by the engineering tool 28 occurs. Note that the engineering tool 28 sets, in the device management section 16X, events for collecting device information for each device information.

In the case of cyclically collecting device information, the device management section 16X collects device information from the devices 31X and 32X at intervals set by the engineering tool 28. Note that the engineering tool 28 sets, in the device management section 16X, intervals for collecting device information for each device information. The device management section 16X sends the device information collected from the devices 31X and 32X to the configuration management section 15X.

The configuration management section 15X includes a data storage section 19X that stores the collected device information. In a case where the data server 10X is the slave data server, the data storage section 19X stores the device information of the devices 31X and 32X. Alternatively, in a case where the data server 10X is the master data server, the data storage section 19X stores the device information of the devices 31X and 32X and the device information of the devices 31Y and 32Y collected from the data server 10Y serving as the slave data server. In this manner, the configuration management section 15X logs the device information of the data server 10Y connected to the data server 10X.

The configuration management section 15X controls data processing in the inter-unit linking section 12X. Therefore, the configuration management section 15X has the function of a control section that controls data processing. Data processing that is executed by the configuration management section 15X includes data transmission/reception or data analysis. The configuration management section 15X according to the embodiment controls the master-slave management section 14X, the device management section 16X, and the data transfer section 17X. The configuration management section 15X controls the master-slave management section 14X when performing data communication with the client 1, and controls the data transfer section 17X when performing data communication with the data server 10Y.

The configuration management section 15X also controls the device management section 16X when performing data communication with the devices 31X and 32X.

The configuration management section 15X has the function of an OPC UA control section that executes control in accordance with the protocol specified by the OPC UA standard in order to perform data communication with the client 1 or the data server 10Y in accordance with OPC UA. Note that the configuration management section 15X may control the protocol conversion section 18X this case, the configuration management section 15X is connected to the protocol conversion section 18X.

In a case where the data server 10X is the master data server, in response to a request for the device information of the devices 31X and 32X from the client 1, the configuration management section 15X sends the device information of the devices 31X and 32X to the client 1 via the master-slave management section 14X.

In addition, in a case where the data server 10X is the master data server, in response to a request for the device information of the devices 31Y and 32Y from the client 1, the configuration management section 15X sends the device information of the devices 31Y and 32Y collected from the data server 10Y to the client 1 via the master-slave management section 14X.

Alternatively, in a case where the data server 10X is the slave data server, in response to a data transfer request from the client 1, the configuration management section 15X transfers the data transfer request to the data server 10Y via the data transfer section 17X.

In addition, in a case where the data server 10X as the slave data server, in response to a request for device information from the data server 10Y serving as the master data server, the configuration management section 15X transfers the device information of the devices 31X and 32X to the client 1 via the data transfer section 17X. Further, the configuration management section 15X transfers the master-slave information sent from the client 1 to the data server 10X.

The data storage section 19X stores the connection configuration information sent from the engineering tool 28. In a case where the data server 10X is the master data server, the data storage section 19X stores connection configuration information indicating that the data server 10Y is connected to the devices 31Y and 32Y and that the data server 10X is connected to the devices 31X and 32X. Note that the data storage section 19X may be arranged outside the configuration management section 15X.

The protocol conversion section 18X converts communication protocols within the server system 101 to connect networks that use different communication protocols. Specifically, the protocol conversion section 18X converts the communication protocol between the client 1 and the data server 10X into the communication protocol between the data servers 10X and 10Y. The protocol conversion section 18X also converts data that conform to the communication protocol between the data servers 10X and 10Y into data that conform to the communication protocol between the client 1 and the data server 10X.

In a case where the communication protocol between the client 1 and the data server 10X is CPC UA and the communication protocol between the data servers 10X and 10Y is Ethernet, the protocol conversion section 18X converts OPC UA data into Ethernet data and converts Ethernet into OPC UA.

The data transfer section 17X converts data in the data server 10X into an electric signal of a format that can be transmitted via the communication line 4. In other words, the data transfer section 17X converts communication data into a specified format when exchanging data between the data servers 10X and 10Y. The data transfer section 17X then sends the converted information to the data server 10Y via the communication line 4. The data transfer section 17X also converts the electric signal sent from the data server 10Y into data that can be handled in the data server 10X. The data transfer section 17X also arbitrates communication between the data servers 10X and 10Y.

The data server 10Y has the same configuration as the data server 10X. That is, the data server 10Y includes an inter-unit linking section 12Y having the same function as the inter-unit linking section 12X and a RAM 93Y having the same function as the RAM 93X. The inter-unit linking section. 12Y includes a master-slave management section 14Y having the same function as the master-slave management section 14X, a device management section 16Y having the same function as the device management section 16X, and a configuration management section 15Y having the same function as the configuration management section 15X. The configuration management section 15Y includes a data storage section 19Y having the same function as the data storage section 19X. The inter-unit linking section 12Y includes a data transfer section 17Y having the same function as the data transfer section 17X and a protocol conversion section 18Y having the same function as the protocol conversion section 18X. Note that the connection relationship between the components of the data server 10X is the same as the connection relationship between the components of the data server 10Y.

In a case where the data server 10Y is the master data server, the data transfer section 17Y receives a data collection request from the client 1 sent from the data transfer section 17X. The data transfer section 17Y sends the received data collection request to the master-slave management section 14Y. Consequently, the master-slave management section 14Y accepts the data collection request from the client 1. The master-slave management section 14Y then sends the data collection request from the client 1 to the configuration management section 15Y.

In a case where the data server 10Z is arranged, a data transfer section 17Z (not illustrated) included in the data server 10Z is connected to the data transfer section 17Y of the data server 10Y. The device management section 16X may collect information not only from the devices 31X and 32X but also from another unit such as a PLC. In this case, the data storage section 19X of the configuration management section 15X stores the information collected by the configuration management section 15X from another unit. In a case where the device management section 16X accesses another unit to collect information, the unit accessed by the device management section 16X is the first external instrument. In a case where the device management section 16Y accesses another unit to collect information, the unit accessed by the device management section. 16Y is the second external instrument. In a case where the configuration management section 15X collects information from another unit, the engineering tool 28 adds, to connection configuration information, information on which information is collected by the unit.

Figure 4:
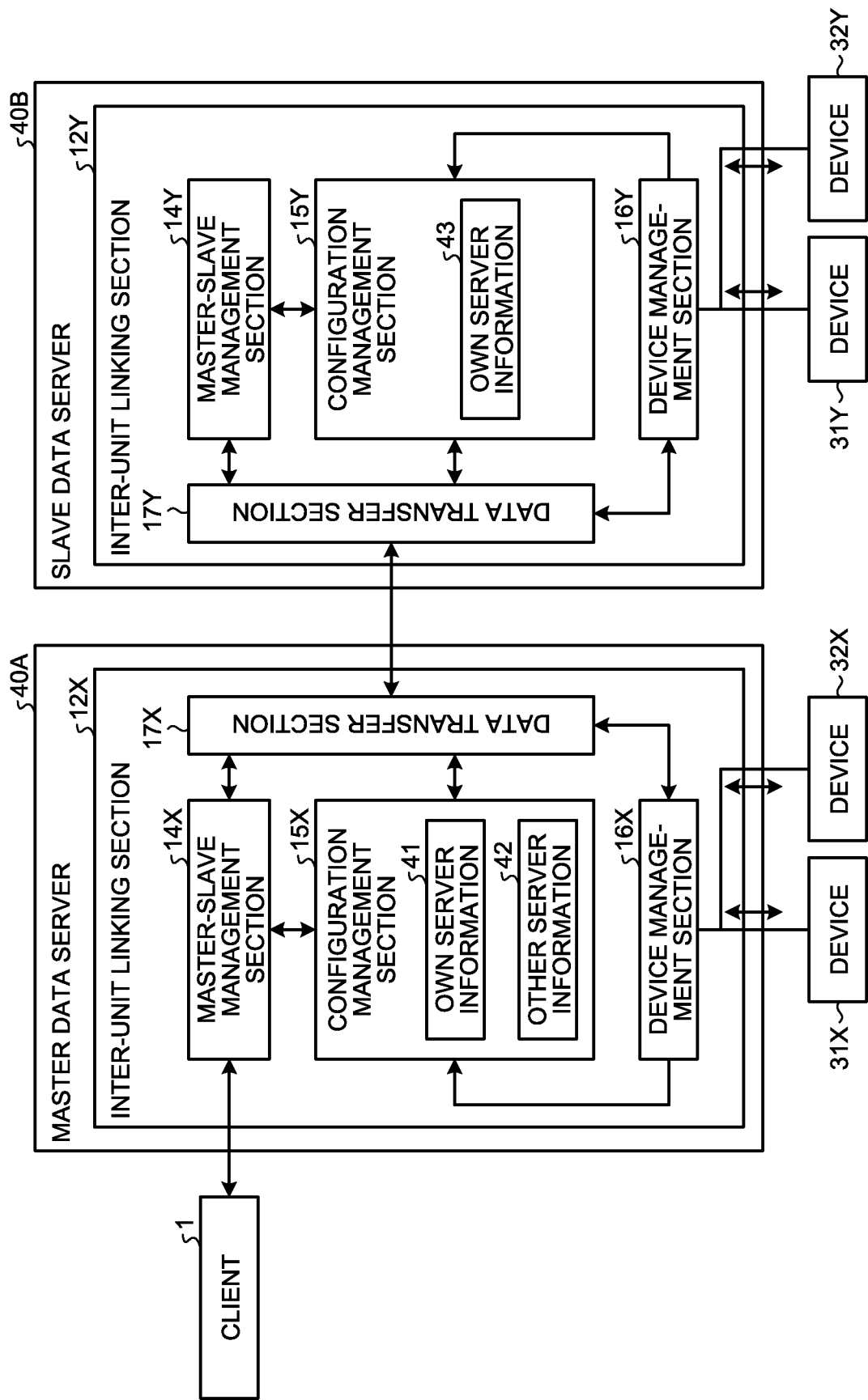
FIG. 4 is a diagram for explaining the process of collecting data in response to a data collection request from a client to a master data server unit according to the embodiment.

Next, the process of collecting device information in response to a data collection request from the client 1 will be described FIG. 4 is a diagram for explaining the process of collecting data in response to a data collection request from the client to the master data server according to the embodiment. Referring to FIG. 4, the process of collecting device information when the data server 10X connected to the client 1 serves as the master data server will be described. In the server system 101, in a case where the data server 10X serves as the master data server, the data server 10Y serves as the slave data server.

The master data server 40A in FIG. 1 is the data server 10X connected to the client 1, and the slave data server 40B in FIG. 4 is the data server 10Y that is not connected to the client 1. In this case, the slave data server 40B is another data server from the viewpoint of the master data server 40A.

Before starting to operate, the data server 10X is set as the master data server 40A in accordance with an instruction from the engineering tool 28. Before starting to operate, the data server 10Y is set as the slave data server 40B in accordance with an instruction from the engineering tool 28.

Consequently, the master-slave management sections 14X and 14Y each store master-slave information, i.e. the instruction from the engineering tool 28. The master-slave information stored in the master-slave management section 14X is master information indicating that the data server 10X is the master data server 40A. The master-slave information stored in the master-slave management section 14Y is slave information indicating that the data server 10Y is the slave data server 40B. The master-slave information stored in the data server 10Y also includes information on which data server is the master data server 40A.

In FIG. 4, the RAM 93X, the protocol conversion section 18X, and the data storage section 19X of the master data server 40A are not illustrated. Similarly, in FIG. 4, the RAM 93Y, the protocol conversion section 18Y, and the data storage section 19Y of the slave data server 40B are not illustrated.

After the slave data server 40B starts to operate, the device management section 16Y collects own server information 43 at the timing designated by the engineering tool 28. The own server information 43 here is the device information of the devices 31Y and 32Y connected to the slave data server 40B. The configuration management section 15Y stores the own server information 43 collected by the device management section 16Y in the data storage section. 19Y.

After the master data server 40A starts to operate, the device management section 16X collects own server information 41 at the timing designated by the engineering tool 28. The own server information 41 here is the device information of the devices 31X and 32X connected to the master data server 40A.

In addition, after the master data server 40A starts to operate, the configuration management section 15X collects other server information 42 from the slave data server 40B at the timing designated by the engineering tool 28. The other server information 42 here is part or all of the own server information 43 collected by the slave data server 40B. The configuration management section 15X according to the embodiment may collect the other server information 42 from the slave data server 40B at any timing. Specifically, the configuration management section 15X collects the other server information 42 at regular intervals designated by the engineering tool 28. Note that the configuration management section 15X may collect the other server information 42 when receiving a data collection request for requesting the device information of the devices 31Y and 32Y from the client 1. In this case, the configuration management section 15X may extract and collect the device information designated in the data collection request from the client 1, or may collect all the latest other server information 42. In the following description, the configuration management section 15X collects the other server information 42 at regular intervals designated by the engineering tool 28.

Note that the client 1 performs the same processing regardless of whether the client 1 is connected to the master data server such as the master data server 40A or the client 1 is connected to the slave data server such as the slave data server 40B. That is, the client 1 sends the same type of data collection request to the data server 10X regardless of which of the data servers 10X and 10Y is the master data server. Specifically, the client 1 sends a data collection request designating device information to the data server 10X without recognizing the connection location of the devices.

In a case where the client 1 is connected to the master data server 40A, the client 1 requests device information from the master data server 40A. Specifically, the client 1 sends, to the master-slave management section 14X of the data server 10X, a data collection request for requesting the device information of any of the devices 31X, 32X, 31Y, and 32Y. Since the master-slave management section 14X stores master information indicating that the data server 10X is the master data server 40A, the master-slave management section 14X sends the master information and the data collection request to the configuration management section 15X.

Consequently, the configuration management section 15X determines that the data server 10X is the master data server 40A, and starts to collect device information. The data collection request includes device designation information for identifying the device information to be collected. The device designation information includes information designating any of the devices and information designating any of the information items included in the device information. The information designating any of the devices is information designating any of the devices 31X, 32X, 31Y, and 32Y. The information designating any of the information items included in the device information is information designating the type of device information. The information item is, for example, the location of the device, the state of the device, the environment in which the device is placed, or a detection value detected by the device.

Based on the connection configuration information and the device designation information in the data collection request, the configuration management section 15X determines which data server the device designated by the device designation information is connected to.

If the configuration management section 15X determines that the devices designated by the device designation information are the devices 31X and 32X connected to the master data server 40A, the configuration management section 15X determines that the master data server 40A manages the device information.

In contrast, if the configuration management section 15X determines that the devices designated by the device designation information are the devices 31Y and 32Y connected to the slave data server 40B, the configuration management section 15X determines that the slave data server 40B manages the device information.

(Case A1)

First, a case where a device information request from the client 1 is for the device information of the devices 31X and 32X connected to the master data server 40A be described.

In response to determining that the device information requested in the data collection request from the client 1 is managed by the master data server 40A, the configuration management section 15X reads the device information corresponding to the device designation information from the own server information 41. In this way, in a case where the client 1 has designated the devices 31X and 32X connected to the master data server 40A, the configuration management section 15X reads the device information of the devices 31X and 32X from the own server information 41.

The configuration management section 15X then sends the read device information to the master-slave management section 14X, and the master-slave management section 14X sends the device information sent from the configuration management section 15X to the client 1. Consequently, the client 1 can collect the device information of the devices designated by the device designation information without grasping the location of the devices corresponding to the device information. The above is the processing in case A1.

(Case A2)

Next, a case where a device information request from the client 1 is for the device information of the devices 31Y and 32Y connected to the slave data server 40B will be described.

In response to determining that the device information requested in the data collection request from the client 1 is managed by the slave data server 40B, the configuration management section 15X reads the device information corresponding to the device designation information from the other server information 42. In this case, if the device information designated by the device designation information is not included in the other server information 42, the configuration management section 15X collects the device information designated by the device designation information from the slave data server 40B, and adds the device information to the other server information 42. The configuration management section 15X then reads the device information corresponding to the device designation information from the other server information 42. Note that the configuration management section 15X may send the device designation information to the slave data server 40B to cause the slave data server 40B to extract the device information corresponding to the device designation information. In this case, the slave data server 40B sends the extracted device information to the master data server 40A.

In a case where the client 1 has designated the devices 31Y and 32Y in the device designation information, the configuration management section 15 reads the device information of the devices 31Y and 32Y from the other server information 42. The configuration management section 15X then sends the read device information to the master-slave management section 14X, and the master-slave management section 14X sends the device information sent from the configuration management section 15X to the client 1. Consequently, the client 1 can collect the device information of the devices designated by the device designation information without grasping the location of the devices corresponding to the device information.

Note that in a case where the data server 10Z is arranged in the data server group 100, the data server 10X sends a collection request for device information to the data server 10Z via the data server 10Y when collecting the device information from the data server 10Z. Then, the data server 10Z sends the device information to the data server 10X via the data server 10Y. The above is the processing in case A2.

Figure 5:
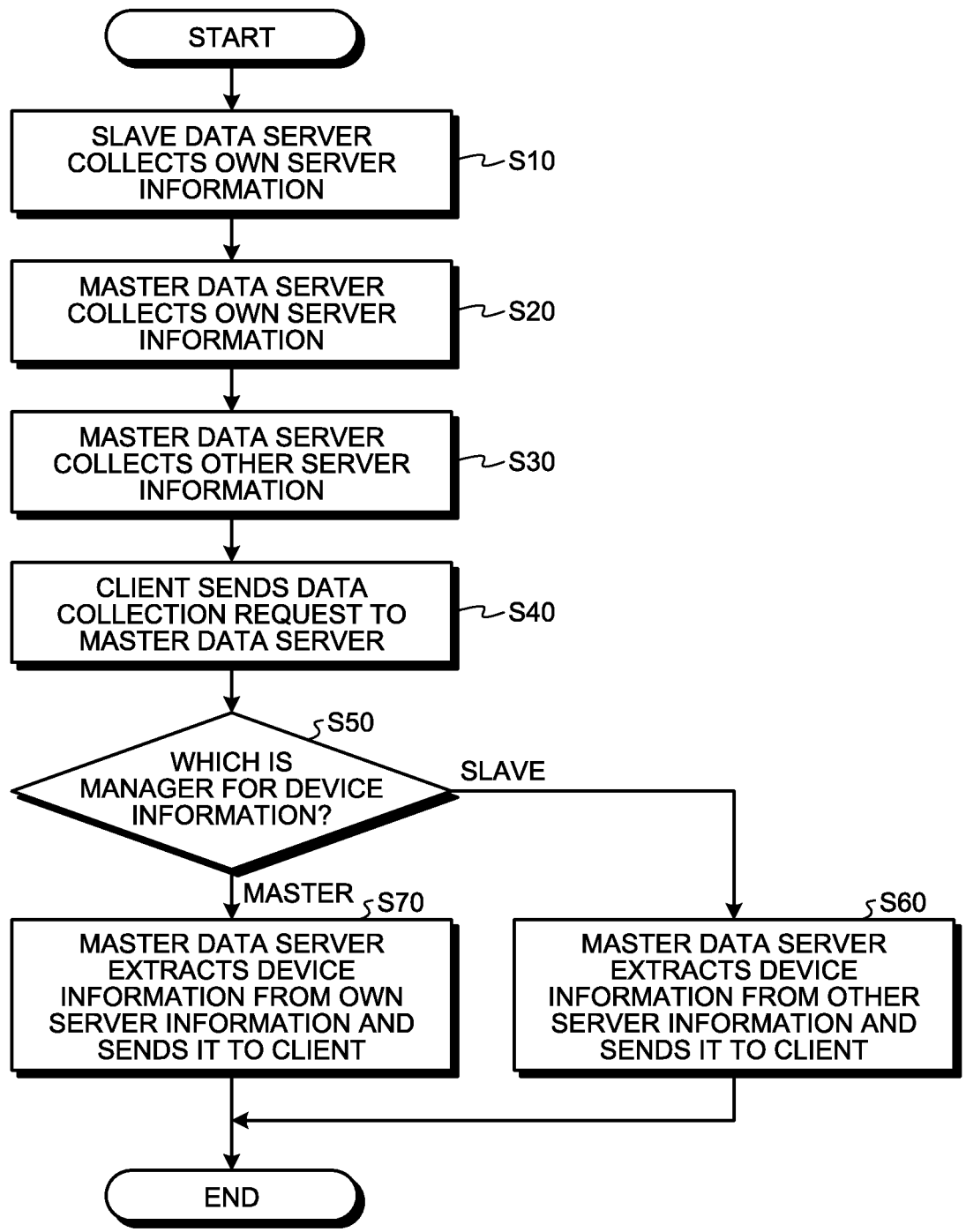
FIG. 5 is a flowchart illustrating the procedure for collecting data in response to a data collection request from the client to the master data server unit according to the embodiment.

Next, the procedure for the collection processing described with reference to FIG. 4 will be described. FIG. 5 is a flowchart illustrating the procedure for collecting data in response to a data collection request from the client to the master data server according to the embodiment. Here, the procedure for collecting device information when the data server 10X connected to the client 1 serves as the master data server 40A will be described. Note that processes in FIG. 5 similar to the processes described with reference to FIG. 4 are not described here.

After the slave data server 40B starts to operate, in step S10, the slave data server 40B collects the own server information 43 at the timing designated by the engineering tool 28.

After the master data server 40A starts to operate, in step S20, the master data server 40A collects the own server information 41 at the timing designated by the engineering tool 28.

After the master data server 40A starts to operate, in step S30, the master data server 40A collects the other server information 42 from the slave data server 40B at the timing designated by the engineering tool 28. The other server information 42 is part or all of the own server information 43. Note that the server system 101 may execute steps S10 to S30 in any order.

Thereafter, in step S40, the client 1 sends a data collection request to the master data server 40A, whereby the client 1 requests device information from the master data server 40A.

Consequently, in step S50, based on the connection configuration information and the device designation information in the data collection request, the master data server 40A determines whether the manager, i.e. the apparatus that collects the device information requested by the client 1, is the master data server 40A or the slave data server 40B.

If the master data server 40A determines that the manager for the device information is the slave data server 40B, that is, in the case of "slave" in step S50, the master data server 40A extracts in step S60 the device information from the other server information 42 and sends the device information to the client 1. Specifically, the master data server 40A extracts, from the other server information 42, the device information corresponding to the device designation information from the client 1. The master data server 40A then sends the extracted device information to the client 1.

If the master data server 40A determines that the manager for the device information is the master data server 40A, that is, in the case of "master" in step S50, the master data server 40A extracts the device information from the own server information 41 in step S70. Specifically, the master data server 40A extracts, from the own server information 41, the device information corresponding to the device designation information from the client 1. The master data server 40A then sends the extracted device information to the client 1.

Next, the process of collecting device information when the data server 10X connected to the client 1 serves as the slave data server and the data server 10Y that is not connected to the client 1 serves as the master data server will be described.

Figure 6:
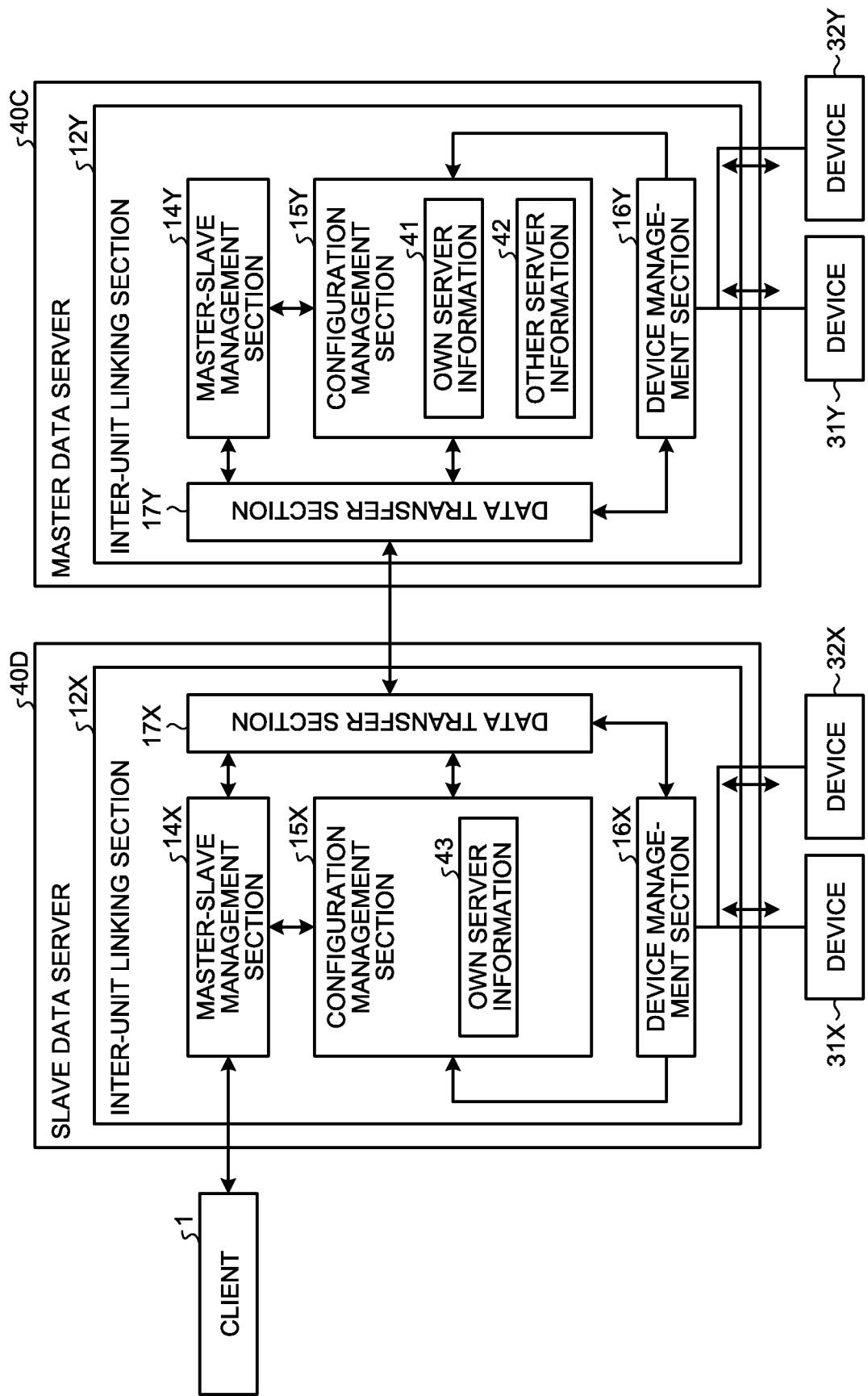
FIG. 6 is a diagram for explaining the process of collecting data in response to a data collection request from the client to a slave data server unit according to the embodiment.

FIG. 6 is a diagram for explaining the process of collecting data in response to a data collection request from the client to the slave data server according to the embodiment. Referring to FIG. 6, the process of collecting device information when the data server 10X connected to the client 1 serves as the slave data server will be described. In the server system 101, in a case where the data server 10X serves as the slave data server, the data server 10Y serves as the master data server. Note that processes in FIG. 6 similar to the processes described with reference to FIG. 4 are not described here.

The slave data server 40D in FIG. 6 is the data server 10X connected to the client 1, and the master data server 40C in FIG. 6 is the data server 10Y that is not connected to the client 1. In this case, the slave data server 40D is another data server from the viewpoint of the master data server 40C. Before starting to operate, the data server 10X becomes the slave data server 40D in accordance with an instruction from the engineering tool 28. Before starting to operate, the data server 10Y becomes the master data server 40C in accordance with an instruction from the engineering tool 28.

Consequently, the master-slave management sections 14X and 14Y each store master-slave information, i.e. the instruction from the engineering tool 28. The master-slave information stored in the master-slave management section 14X is slave information indicating that the data server 10X is the slave data server 40D. The master-slave information stored in the master-slave management section 14Y is master information indicating that the data server 10Y is the master data server 40C. The master-slave information stored in the data server 10X also includes information on which data server is the master data server 400.

In FIG. 6, the RAM 93Y, the protocol conversion section 18Y, and the data storage section 19Y of the master data server 400 are not illustrated. Similarly, in FIG. 6, the RAM 93X, the protocol conversion section 18X, and the data storage section 19X of the slave data server 40D are not illustrated.

After the slave data server 40D starts to operate, the device management section 16X collects the own server information 43 at the timing designated by the engineering tool 28. The own server information 43 here is the device information of the devices 31X and 32X connected to the slave data server 40D. The configuration management section 15X stores the own server information 43 collected by the device management section 16X in the data storage section 19X.

After the master data server 40C starts to operate, the device management section 16Y collects the own server information 41 at the timing designated by the engineering tool 28. The own server information 41 here is the device information of the devices 31Y and 32Y connected to the master data server 40C.

In addition, after the master data server 40C starts to operate, the configuration management section 15Y collects the other server information 42 from the slave data server 40D at the timing designated by the engineering tool 28. The other server information 42 here is part or all of the own server information 43 collected by the slave data server 40D. Like the configuration management section 15X described with reference to FIG. 4, the configuration management section 15Y according to the embodiment may collect the other server information 42 from the slave data server 10D at any timing.

In a case where the client 1 is connected to the slave data server 40D, the client 1 requests device information from the slave data server 40D. Specifically, the client 1 sends, to the master-slave management section 14X of the data server 10X, a data collection request for requesting the device information of any of the devices 31X, 32X, 31Y, and 32Y. Since the master-slave management section 14X stores slave information indicating that the data server 10X is the slave data server 40D, the master-slave management section 14X sends the slave information and the data collection request to the configuration management section 15X. Consequently, the configuration management section 15X determines that the data server 10X is the slave data server 40D, and sends the data collection request to the master data server 40C.

Based on the connection configuration information and the device designation information in the data collection request, the configuration management section 15Y determines which data server the device designated by the device designation information is connected to.

If the configuration management section 15Y determines that the devices designated by the device designation information are the devices 31Y and 32Y connected to the master data server 40C, the configuration management section 15Y determines that the master data server 40C manages the device information.

If the configuration management section 15Y determines that the devices designated by the device designation information are the devices 31K and 32K connected to the slave data server 40D, the configuration management section 15Y determines that the slave data server 10D manages the device information. The processes of the master data server 10C and the slave data server 40D will be described below separately for case B1 and case B2.

(Case B1)

A case where a device information request from the client 1 is for the device information of the devices 31Y and 32Y connected to the master data server 40C will be described.

In response to determining that the device information requested in the data collection request from the client 1 is managed by the master data server 40C, the configuration management section 15Y reads the device information corresponding to the device designation information from the own server information 41. In this way, in a case where the client 1 has designated the devices 31Y and 32Y connected to the master data server 40C, the configuration management section 15Y reads the device information of the devices 31Y and 32Y from the own server information 41.

The configuration management section 15Y then sends the read device information to the master-slave management section 14Y, and the master-slave management section 14Y sends the device information sent from the configuration management section 15Y to the client 1. At this time, the master data server 40C sends the device information to the slave data server 40D, and the slave data server 40D sends the device information to the client 1. Consequently, the client 1 can collect the device information of the devices designated by the device designation information without grasping the location of the devices corresponding to the device information. The above is the processing in case B1.

(Case B2)

Next, a case where a device information request from the client 1 is for the device information of the devices 31X and 32X connected to the slave data server 40D will be described.

In response to determining that the device information requested in the data collection request from the client 1 is managed by the slave data server 40D, the configuration management section 15Y reads the device information corresponding to the device designation information from the other server information 42. In this case, if the device information designated by the device designation information is not included in the other server information 42, the configuration management section 15Y collects the device information designated by the device designation information from the slave data server 40D, and adds the device information to the other server information 42. The configuration management section 15Y then reads the device information corresponding to the device designation information from the other server information 42. In this way, in a case where the client 1 has designated the devices 31X and 32X in the device designation information, the configuration management section 15Y reads the device information of the devices 31X and 32X from the other server information 42.

The configuration management section 15Y then sends the read device information to the master-slave management section 14Y, and the master-slave management section 14Y sends the device information sent from the configuration management section 15Y toward the client 1. In other words, the master data server 40C sends the device information to the slave data server 40D in communication with the client 1. Specifically, the master data server 40C sets the client 1 as a destination, and sends the device information to the slave data server 40D. Then, the slave data server 40D sends the device information to the client 1. Consequently, the client 1 can collect the device information of the devices designated by the device designation information without grasping the location of the devices corresponding to the device information. The above is the processing in case B2.

Note that in a case where the data server 10Z is arranged in the data server group 100, the data server 10Z can sometimes serve as the master data server. In this case, the data server 10X sends a data collection request from the client 1 to the data server 10Y, and the data server 10Y sends the data collection request to the data server 10Z. In addition, the data server 10Z sends the device information requested by the client 1 to the data server 10Y, and the data server 10Y sends the device information to the data server 10X. Then, the data server 10X sends the device information to the client 1.

Figure 7:
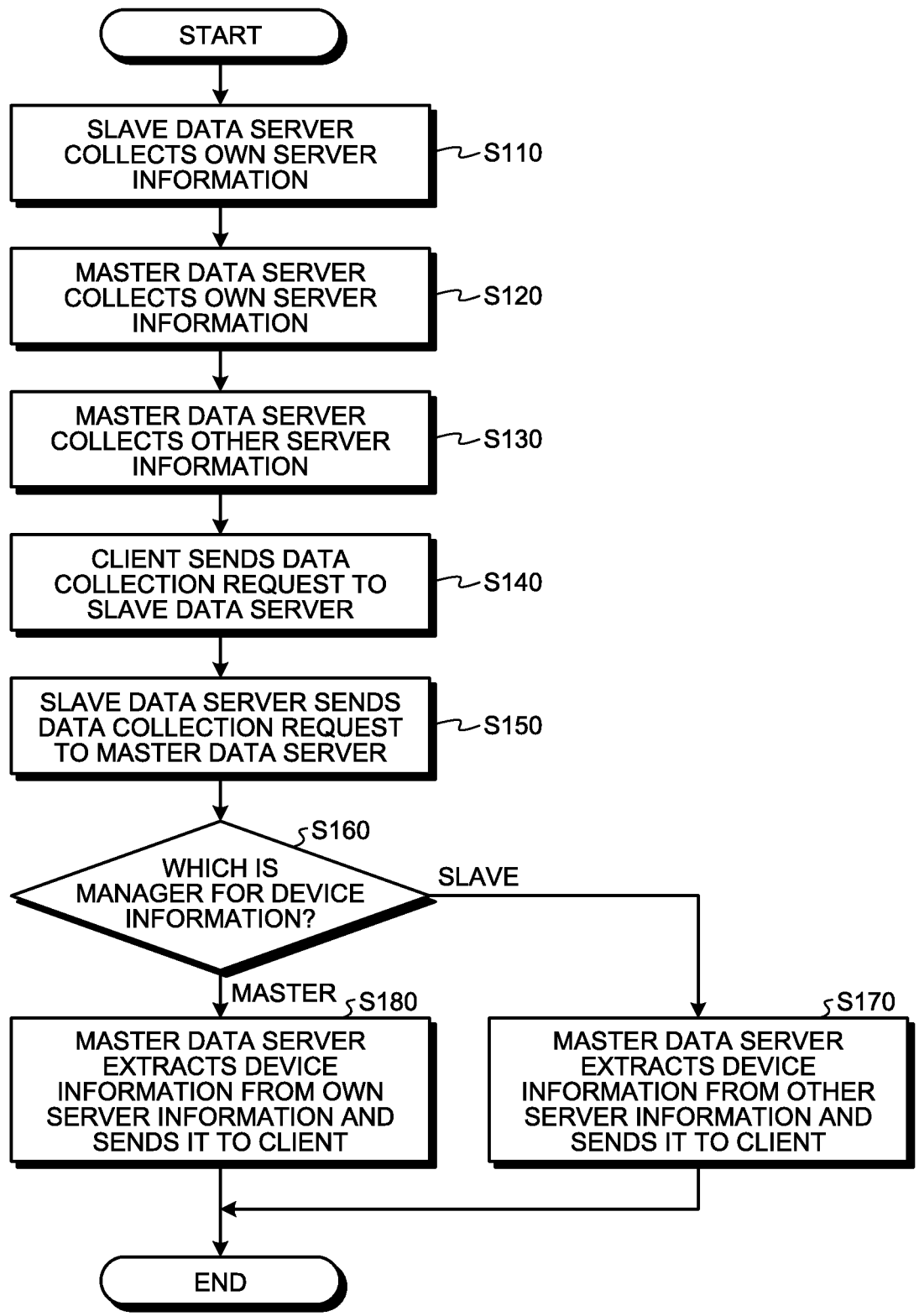
FIG. 7 is a flowchart illustrating the procedure for collecting data in response to a data collection request from the client to the slave data server unit according to the embodiment.

Next, the procedure for the collection processing described with reference to FIG. 6 will be described. FIG. 7 is a flowchart illustrating the procedure for collecting data in response to a data collection request from the client to the slave data server according to the embodiment. Here, the procedure for collecting device information when the data server 10X connected to the client 1 serves as the slave data server 40D will be described. Note that processes in FIG. 7 similar to the processes described with reference to FIGS. 5 and 6 are not described here.

After the slave data server 40C starts to operate, in step S110, the slave data server 40D collects the own server information 43 at the timing designated by the engineering tool 28.

After the master data server 40C starts to operate, in step S120, the master data server 40C collects the own server information 41 at the timing designated by the engineering tool 28.

After the master data server 40C starts to operate, in step S130, the master data server 40C collects the other server information 42 from the slave data server 40D at the timing designated by the engineering tool 28. Note that the server system 101 may execute steps S110 to S130 in any order.

Thereafter, in step S140, the client 1 sends a data collection request to the slave data server 40D, whereby the client 1 requests device information from the slave data server 40D.

Consequently, in step S150, the slave data server 40D sends the data collection request to the master data server 40C. In step S160, based on the connection configuration information and the device designation information in the data collection request, the master data server 40C determines whether the manager for the device information requested by the client 1 is the master data server 40C or the slave data server 40D.

If the master data server 40C determines that the manager for the device information is the slave data server 40D, that is, in the case of "slave" in step S160, the master data server 40C extracts device information from the other server information 42 in step S170. Specifically, the master data server 40C extracts, from the other server information 42, the device information corresponding to the device designation information from the client 1. The master data server 40C then sends the extracted device information to the client 1 via the slave data server 40D.

If the master data server 40C determines that the manager for the device information is the master data server 10C, that is, in the case of "master" in step S160, the master data server 40C extracts in step S180 the device information from the own server information 41 and sends the device information to the client 1. Specifically, the master data server 40C extracts, from the own server information 41, the device information corresponding to the device designation information from the client 1. The master data server 40C then sends the extracted device information to the client 1.

In this manner, the client 1 according to the embodiment can collect desired device information just by sending a data collection request designating devices to the data server 10X connected to the client 1 without grasping the location of the devices corresponding to the device information. As a result, the convenience of access by the client 1 is improved, and the system scale can be reduced.

Next, exemplary connection configurations between the client 1 and the data servers 10X to 10Z in the communication system 102 will be described. As described with reference to FIG. 1, in the communication system 102, the client 1 and the data servers 10X to 10Z may be connected via the bus B1 in the PLC system 91. The connection configuration between the client 1 and the data servers 10X to 10Z described with reference to FIG. 1 is hereinafter referred to as a first connection configuration.

Figure 8:
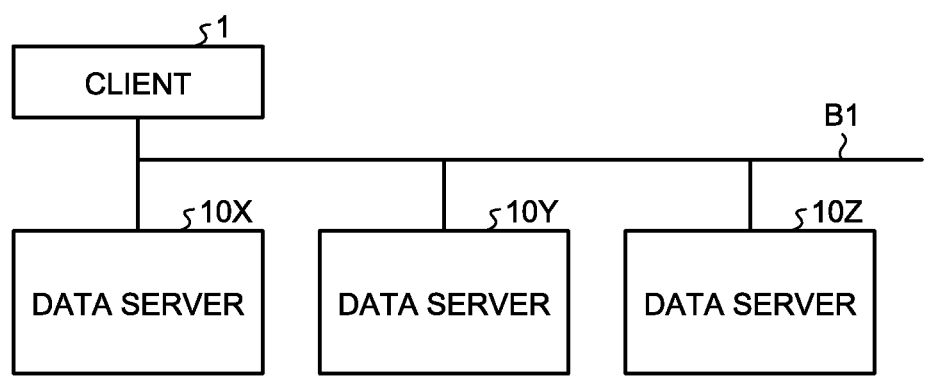
FIG. 8 is a connection configuration diagram in which the data server units according to the embodiment are connected in a first connection configuration.

FIG. 8 is a connection configuration diagram in which the data servers according to the embodiment are connected in the first connection configuration. In a case where the data servers 10X to 10Z are connected in the first connection configuration, the client 1 and the data servers 10X to 10Z are connected to the bus B1. Note that the client 1 may not be connected to the bus B1. In this case, the client 1 is connected to any of the data servers 10X to 10Z.

As described with reference to FIG. 2, in the communication system 102, the client 1 and the data server 10X may be connected to each other, and the data server 10X and the data server 10Y may be connected to each other. In addition, the data server 10Y and the data server 10Z (not illustrated in FIG. 2) may be connected to each other. In other words, in the communication system 102, the client 1 and the data servers 10X to 10Z may be connected in series. The connection configuration between the client 1 and the data servers 10X to 10Z described with reference to FIG. 2 is hereinafter referred to as a second connection configuration. The connection configuration diagram in which the data servers 10X to 10Z are connected in the second connection configuration is as illustrated in the data server group 100 in FIG. 2.

The communication system 102 may use both the first connection configuration and the second connection configuration. The connection configuration including both the first and second connection configurations is hereinafter referred to as a third connection configuration.

Figure 9:
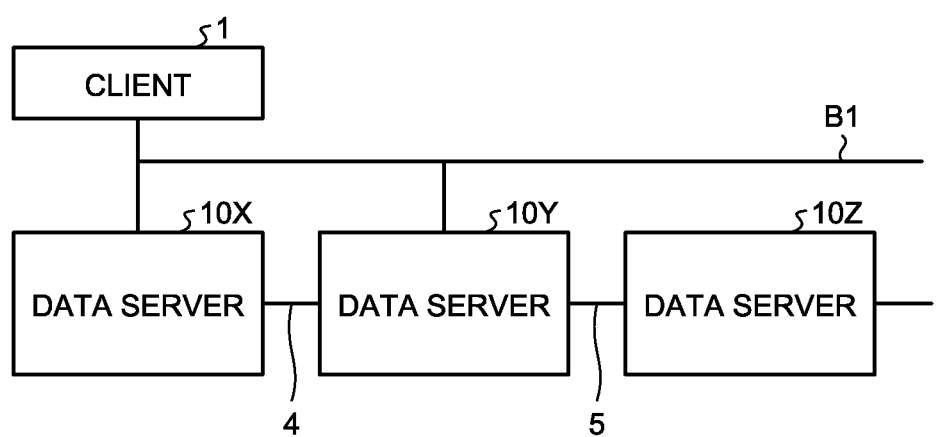
FIG. 9 is a connection configuration diagram in which the data server units according to the embodiment are connected in a third connection configuration.

FIG. 9 is a connection configuration diagram in which the data servers according to the embodiment are connected in the third connection configuration. In a case where the data servers 10X to 10Z are connected in the third connection configuration, the client 1 and the data servers 10X to 10Z are connected to the bus B1. Regarding the data servers 10X to 10Z, the data server 10X and the data server 10Y are connected by the communication line 4, and the data server 10Y and the data server 10Z are connected by the communication line 5. In other words, in a case where the data servers 10X to 10Z are connected in the third connection configuration, the client 1 and the data servers 10X to 10Z are connected to the bus B1 and also connected in series. As in the above case, the client 1 may not be connected to the bus B1.

In the first to third connection configurations illustrated in FIGS. 2, 8, and 9, the client 1 and the data server 10X perform data communication using the communication scheme specified by OPC UA between the client 1 and the data server 10X. Between the data servers 10X and 10Y, the data servers 10X and 10Y perform data communication using the communication scheme specified by Ethernet.

Next, processes for setting the master data server and the slave data server with the engineering tool 28 will be described. The engineering tool 28 executes the setting of the master data server and the slave data server for the data servers 10X and 10Y using various setting methods for the respective connection configurations between the client 1 and the data servers 10X and 10Y. In the following description, the processes in which each of the data servers 10X and 10Y is set as the master data server or the slave data server are referred to as master-slave setting processes.

Figure 10:
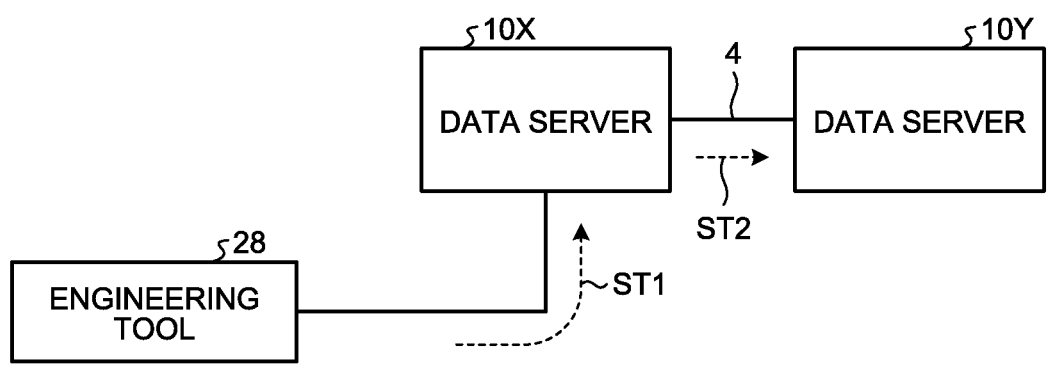
FIG. 10 is a diagram for explaining a first master-slave setting process according to the embodiment.

FIG. 10 is a diagram for explaining a first master-slave setting process according to the embodiment. Although the data servers 10X and 10Y are connected by the communication line 4 in FIG. 10, the data servers 10X and 10Y may be connected by the bus B1.

In the first master-slave setting process, the engineering tool 28 sends in step ST1 an instruction to the data server 10X connected to the engineering tool 28. This instruction is an instruction to cause either the data server 10X or the data server 10Y to be set as the master data server and the other to be set as the slave data server. Therefore, the data server 10X executes the setting for becoming the master data server or the slave data server in accordance with the instruction from the engineering tool 28.

Furthermore, in the first master-slave setting process, the data server 10X transfers in step ST2 the instruction from the engineering tool 28 to the data server 10Y connected to the data server 10X. Then, the data server 10Y executes the setting for becoming the master data server or the slave data server in accordance with the instruction from the engineering tool 28.

Consequently, in a case where the data server 10X becomes the master data server 40A, the data server 10Y becomes the slave data server 40B, and in a case where the data server 10Y becomes the master data server 40C, the data server 10X becomes the slave data server 40D.

Note that in a case where the data server 10Z is connected to the data server 10Y, the engineering tool 28 adds, to an instruction for the data server 10X, an instruction to cause the data server 10Z to become the master data server or the slave data server. Consequently, the data server 10X transfers the instruction from the engineering tool 28 to the data server 10Y, and the data server 10Y transfers the instruction from the engineering tool 28 to the data server 10Z. As a result, one of the data servers 10X to 10Z becomes the master data server, and the others become the slave data servers.

Figure 11:
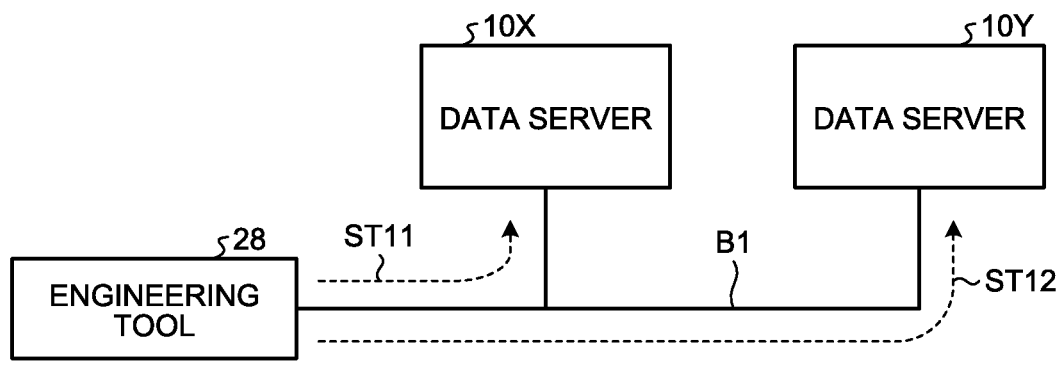
FIG. 11 is a diagram for explaining a second master-slave setting process according to the embodiment.

FIG. 11 is a diagram for explaining a second master-slave setting process according to the embodiment. The second master-slave setting process is performed in a case where the engineering tool 28 is connected to both the data servers 10X and 10Y. In the second master-slave setting process, the engineering tool 28 sends, to each data server, an instruction to cause the data server to become the master data server or the slave data server.

Specifically, in the second master-slave setting process, the engineering tool 28 sends an instruction to the data server 10X via the bus B1 in step ST11. This instruction is an instruction to cause the data server 10X to be set as the master data server or the slave data server. Consequently, the data server 10X executes the setting for becoming the master data server or the slave data server in accordance with the instruction from the engineering tool 28.

In the second master-slave setting process, the engineering tool 28 also sends an instruction to the data server 10Y via the bus B1 in step ST12. This instruction is an instruction to cause the data server 10Y to be set as the master data server or the slave data server. Consequently, the data server 10Y executes the setting for becoming the master data server or the slave data server in accordance with the instruction from the engineering tool 28. Note that in the case of setting the data server 10 as the master data server, the engineering tool 28 sets the data server 10Y as the slave data server, and in the case of setting the data server 10Y as the master data server, the engineering tool 28 sets the data server 10X as the slave data server.

Consequently, in a case where the data server 10X becomes the master data server, the data server 10Y becomes the slave data server, and in a case where the data server 10Y becomes the master data server, the data server 10X becomes the slave data server.

Note that the engineering tool 28 may execute step ST11 before step ST12, or may execute step ST12 before step ST11. In a case where the data server 10Z is connected to the bus B1, the engineering tool 28 sends an instruction to the data server 10Z as well. This instruction is an instruction to cause the data server 10Z to be set as the master data server or the slave data server. Consequently, the data server 10Z executes the setting for becoming the master data server or the slave data server in accordance with the instruction from the engineering tool 28. In this case, one of the data servers 10X to 10Z becomes the master data server, and the others become the slave data servers.

Figure 12:
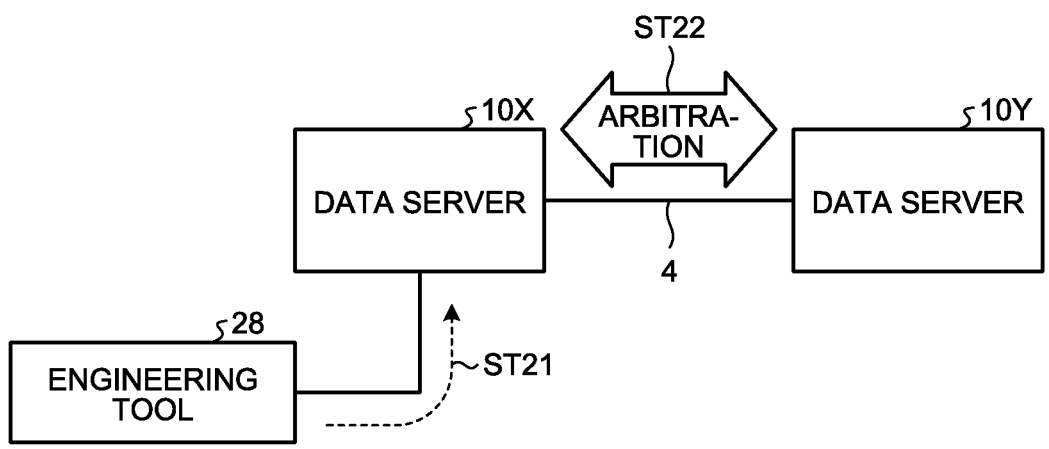
FIG. 12 is a diagram for explaining a third master-slave setting process according to the embodiment.

FIG. 12 is a diagram for explaining a third master-slave setting process according to the embodiment. Although the data servers 10X and 10Y are connected by the communication line 4 in FIG. 12, the data servers 10X and 10Y may be connected by the bus B1.

In the third master-slave setting process, the engineering tool 28 sends in step ST21 an instruction to the data server 10X connected to the engineering tool 28. This instruction is an instruction to cause the data servers 10X and 10Y to execute arbitration processing between them. Arbitration processing is the process which the data servers 10X and 10Y exchange information to set either of them as the master data server and the other as the slave data server.

In response to the data server 10X receiving the instruction to cause execution of arbitration processing, the configuration management sections 15X and 15Y of the data servers 10X and 10Y execute arbitration processing in step ST22. The configuration management sections 15X and 15Y execute arbitration processing using unique information held by the data servers 10X and 10Y. Examples of unique information held by the data servers 10X and 10Y include the product serial numbers of the data servers 10X and 10Y, the Internet protocol (IP) addresses of the data servers 10X and 10Y, and the media access control (MAC) addresses of the data servers 10X and 10Y. The configuration management sections 15X and 15Y execute arbitration processing based on the product serial numbers, the IP addresses, or the MAC addresses. For example, in a case where the configuration management sections 15X and 15Y execute arbitration processing using the product serial numbers, the configuration management sections 15X and 15Y may set the data server with the smallest serial number as the master data server, or may set the data server with the largest serial number as the master data server.

Upon completion of the arbitration processing, the data servers 10X and 10Y execute the setting for becoming the master data server or the slave data server in accordance with the arbitration result. Consequently, in a case where the data server 10X becomes the master data server, the data server 10Y becomes the slave data server, and in a case where the data server 10Y becomes the master data server, the data server 10X becomes the slave data server.

Note that in a case where the engineering tool 28 is connected to the data servers 10X and 10Y, the engineering tool 28 may send an instruction to cause execution of arbitration processing to either the data server 10X or the data server 10Y.

In a case where the data server 10Z is connected to the data server 10Y, the engineering tool 28 sends, to the data server 10X, an instruction to cause the data servers 10X to 10Z to execute arbitration processing between them.

In a case where the engineering tool 28 is connected to the data servers 10X to 10Z, the engineering tool 28 may send an instruction to cause execution of arbitration processing to any of the data servers 10X to 10Z.

Figure 13:
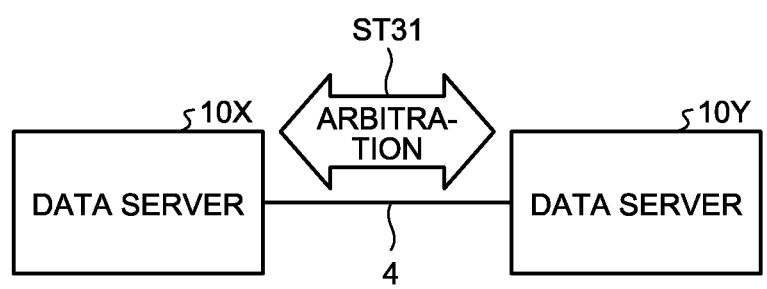
FIG. 13 is a diagram for explaining a fourth master-slave setting process according to the embodiment.

FIG. 13 is a diagram for explaining a fourth master-slave setting process according to the embodiment. Although the data servers 10X and 10Y are connected by the communication line 4 in FIG. 13, the data servers 10X and 10Y may be connected by the bus B1.

In the fourth master-slave setting process, the data servers 10X and 10Y execute arbitration processing in step ST31. That is, in the fourth master-slave setting process, the data servers 10X and 10Y execute arbitration processing without receiving an instruction from the engineering tool 28. The data servers 10X and 10Y execute arbitration processing when activated. In the fourth master-slave setting process, the data servers 10X and 10Y execute arbitration processing using unique information held by the data servers 10X and 10Y in the same manner as in the third master-slave setting process.

Upon completion of the arbitration processing, the data servers 10X and 10Y execute the setting for becoming the master data server or the slave data server in accordance with the arbitration result. Consequently, in a case where the data server 10X becomes the master data server, the data server 10Y becomes the slave data server, and in a case where the data server 10Y becomes the master data server, the data server 10X becomes the slave data server. Note that in a case where the data server 10Z is connected to the data server 10Y, the data servers 10X to 10Z execute arbitration processing.

Figure 14:
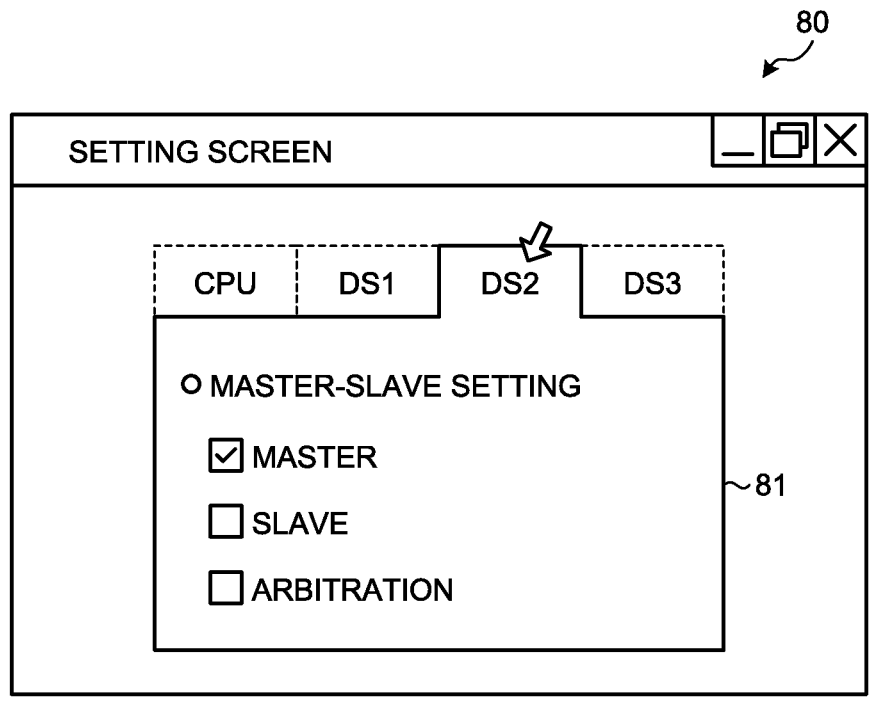
FIG. 14 is a diagram for explaining an example of a screen displayed when an engineering tool according to the embodiment performs a master-slave setting process.

Next, a processing screen for master-slave setting processes will be described. FIG. 14 is a diagram for explaining an example of a screen displayed when the engineering tool according to the embodiment performs a master-slave setting process.

When performing the master-slave setting process, the engineering tool 28 is connected to the data server 10X and causes a display apparatus to display a screen 80. The screen 80 is a screen for displaying the units set by the user. In the illustrated case, the screen 80 displays "CPU", i.e. the unit name of the CPU 8, and "DS1", "DS2", and "DS3", i.e. the unit names of the data servers 10X, 10Y, and 10Z, respectively.

Once the unit selection operation is executed by the user, the engineering tool 28 accepts the selection operation. In the illustrated case, the engineering tool 28 accepts the selection operation for selecting "DS2", i.e. the unit name of the data server 10Y.

In response to accepting the selection operation for selecting any of the data servers 10X to 10Z, the engineering tool 28 displays, on the screen 80, a page indicating setting items for the accepted unit. In the illustrated case, the screen 80 displays a page 81 for the master-slave setting for the data server 10Y. The page 81 displayed on the screen 80 is a page for selecting whether to set the data server 10Y as the master data server, as the slave data server, or to cause the data server 10Y to perform arbitration.

In response to accepting the selection operation for setting the data server 10Y as the master data server, the engineering tool 28 generates an instruction to set the data server 10Y as the master data server. In response to accepting the selection operation for setting the data servers 10X and 10Z as the slave data servers, the engineering tool 28 generates an instruction to set the data servers 10X and 10Z as the slave data servers. Then, the engineering tool 28 sends the generated instructions to any one or all of the data servers 10X to 10Z.

In response to receiving the selection operation for "arbitration" indicating arbitration processing, the engineering tool 28 generates an instruction to cause execution of arbitration processing and sends the generated instruction to any one or all of the data servers 10X to 10Z.

Next, the hardware configuration of the data servers 10X to 10Z described in the embodiment will be described. Since the data servers 10X to 10Z have similar hardware configurations, the hardware configuration of the data server 10X will be described here.

Figure 15:
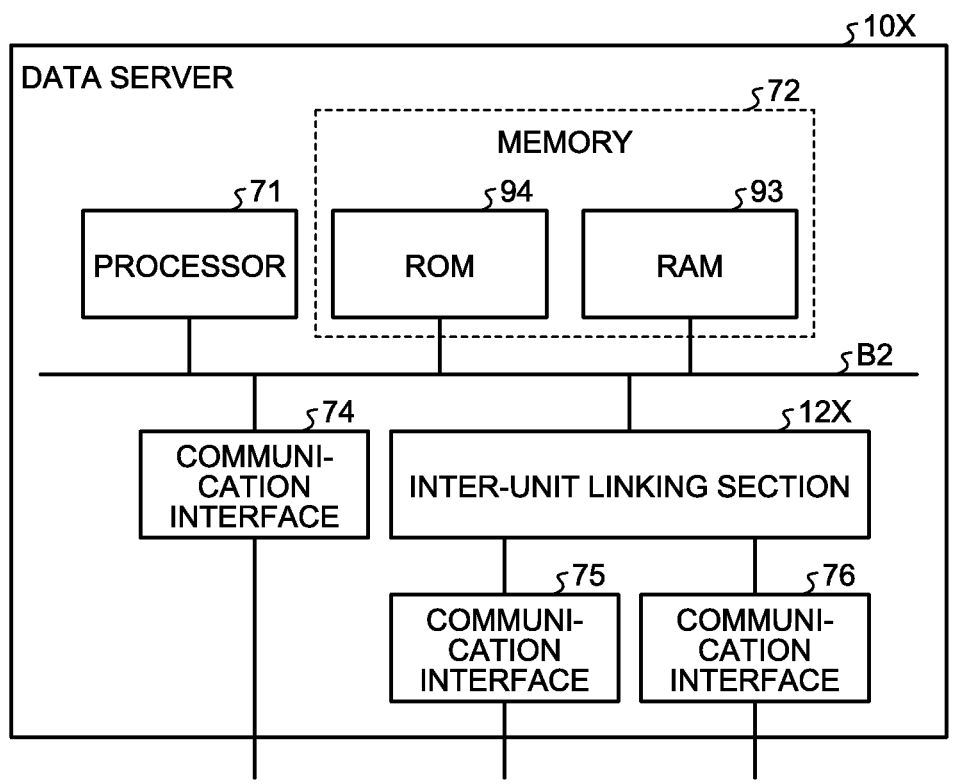
FIG. 15 is a diagram illustrating an exemplary hardware configuration of the data server unit according to the embodiment.

FIG. 15 is a diagram illustrating an exemplary hardware configuration of the data server according to the embodiment. The data server 10X includes a processor 71, a memory 72, communication interfaces 74, 75, and 76, the inter-unit linking section 12X, and the bus B2. In the data server 10X, the processor 71, the memory 72, the communication interfaces 74, 75, and 76, and the inter-unit linking section 12X are connected via the bus B2. In the inter-unit linking section 12X, the master-slave management section 14X may be connected to the bus B2, or each component in the inter-unit linking section 12X may be connected to the bus B2.

The processor 71 is a CPU (also called a central processing unit, a processing unit, an arithmetic unit, a microprocessor, a microcomputer, a processor, and a DSP), a system large scale integration (LSI), or the like.

The memory 72 may be a nonvolatile or volatile semiconductor memory such as the RAM 93, a read only memory (ROM) 94, or a flash memory, or may be a magnetic disk or a flexible disk. In the case illustrated in FIG. 15, the memory 72 is the RAM 93 and the ROM 94. The RAM 93 temporarily stores information unique to the data server 10X, and the ROM 94 stores software or firmware for use in the data server 10X.

The data server 10X is realized by the processor 71 reading and executing a program stored in the memory 72 to operate as the data server 10X. It can also be said that this program causes the computer to execute the procedure or method for the data server 10X. The processor 71 may operate the data server 10X based on the settings created by the user. The memory 72 is also used as a temporary memory when the processor 71 performs various processes.

In this way, the program executed by the processor 71 is a computer program product having a computer-readable and non-transitory recording medium including a plurality of computer-executable instructions for performing data processing. The program executed by the processor 71 causes the computer to execute the data processing with the plurality of instructions.

The inter-unit linking section 12X is a processing circuit that performs the master-slave setting, the collection of the own server information 41, the collection of the other server information 42, the extraction of device information from the own server information 41, and the extraction of device information from the other server information 42. The processing circuit is a single circuit, a composite circuit, a programmed processor, a parallel programmed processor, an application specific integrated circuit (ASIC), a field programmable gate array (FPGA), or a combination thereof. Note that some of the functions of the inter-unit linking section 12X may be realized by a processing circuit that is dedicated hardware, and the other functions may be realized by software or firmware. In the case of realizing the inter-unit linking section 12X by software or firmware, the data server 10X realizes the functions of the inter-unit linking section 12X using the processor 71 and the memory 72.

The communication interfaces 74 and 75 are, for example, Ethernet interfaces. The communication interface 74 is a communication interface for communicating with other instruments connected to the data server 10X. The data server 10X uses the communication interface 74 to communicate with devices other than the devices 31X and 32X or with units other than the data server 10Y.

The communication interface 75 is a communication interface for communicating with the devices 31X and 32X or the client 1 connected to the data server 10X. The communication interface 75 is connected to the inter-unit linking section 12X, and operates in accordance with an instruction from the inter-unit linking section 12X.

In a case where the data server 10X performs data communication with the client 1 in accordance with OPC UA, the communication interface 75 includes the OPC UA interface function.

The communication interface 76 is a communication interface for communicating with the data server 10Y. In a case where the data servers 10X and 10Y are connected by a bus, the communication interface 76 is a bus interface. Alternatively, in a case where the data servers 10X and 10Y are connected using the Ethernet standard, the communication interface 76 is an Ethernet interface. In a case where the data server 10X performs data communication with the data server 10Y in accordance with OPC UA, the communication interface 76 includes the OPC UA interface function.

As described above, according to the embodiment, since the data servers 10X to 10Z cooperate with one another, the client 1 can operate as if it accessed a single data server without being conscious of the presence of the plurality of data servers. Therefore, it is possible to efficiently collect information in other data servers with a simple configuration.

The configuration described in the above-mentioned embodiment indicates an example of the contents of the present invention. The configuration can be combined with another well-known technique, and a part of the configuration can be omitted or changed in a range not departing from the gist of the present invention.

REFERENCE SIGNS LIST 1 client; 4, 5 communication line; 10X to 10Z, 11X, 11Y data server; 12X, 12Y inter-unit linking section; 14X, 14Y master-slave management section; 15X, 15Y configuration management section; 16X, 16Y device management section; 17X, 17Y data transfer section; 19X, 19Y data storage section; 26 higher-level apparatus; 27 the Internet; 28 engineering tool; 31X, 31Y, 32X, 32Y device; 40A, 40C master data server; 40B, 40D slave data server; 41, 43 own server information; 42 other server information; 101 server system.

The invention claimed is:

1. A data server comprising:
a memory to store first information collected from a first external instrument;
master-slave management circuitry to set whether the data server operates according to one of a master function for managing another data server and a slave function for being managed by the other data server; and
a controller, wherein
in a case where the master function is set by the master-slave management circuitry, to collect second information collected by the other data server from the other data server and store the second information in the memory, and the controller sends to an external client, in response to receiving a data collection request from the external client, information corresponding to the data collection request that is one of the first information and the second information received from the other data server in which the slave function is set, and
in a case where the slave function is set by the master-slave management circuitry, the controller sends the first information to the other data server in which the master function is set,
the controller is further configured to store connection configuration information indicating a first connection relationship between the data server and the first external instrument, and a second connection relationship between the other data server and a second external instrument from which the second information is collected, and
the controller is further configured to select the first information or the second information based on the connection configuration information and send the device information selected to the external client.

2. The data server according to claim 1, wherein
in response to receiving the data collection request, the controller selects, based on the connection configuration information, the first information collected by the first external instrument or second information collected by the second external instrument, and sends the selected information to the client as the information corresponding to the data collection request.

3. The data server according to claim 2, wherein
in a case where the second external instrument is designated in the data collection request, the controller identifies, based on the connection configuration information, the other data server that has collected the second information from the second external instrument, and sends the second information collected from the other data server to the client as the information corresponding to the data collection request.

4. The data server according to claim 1, wherein
in the case where the slave function is set, the controller transfers, in response to receiving the data collection request from the client, the data collection request to the other data server in which the master function is set.

5. The data server according to claim 1, further comprising
communication interface circuitry to communicate with the first external instrument, wherein
the first external instrument is a device connected to the communication interface circuitry or an external unit connected to the communication interface circuitry, and
the first information is information about the device or information in the external unit.

6. The data server according to claim 2, wherein
in the case where the master function is set, the controller reads the second information from the other data server in response to receiving the data collection request from the client or at regular intervals.

7. The data server according to claim 1, wherein in the case where the slave function is set, the controller sends the first information to the other data server in which the master function is set in response to a request from the other data server or at regular intervals.

8. The data server according to claim 1, further comprising a controller to collect the first information from the first external instrument, wherein
the controller to collect collects the first information from the first external instrument when an event occurs or at regular intervals.

9. The data server according to claim 1, wherein
the controller controls data communication with the client in accordance with a format specified by OPC or OPC UA.

10. The data server according to claim 1, wherein
the controller controls data communication with the other data server in accordance with a format specified by OPC or OPC UA.

11. A communication system comprising:
a first data server to collect first device information from a first device;
a second data server to collect second device information from a second device; and
a client to collect the first device information and the second device information from the first data server and the second data server, wherein
the first data server includes:
a data storage memory to store the first device information collected by the first data server;
master-slave management circuitry capable of setting the first data server to operate according to one of a master function that is a function of managing the second data server and a slave function that is a function of being managed by the second data server; and
a controller to, in a case where the master function is set, collect the second device information collected by the second data server from the second data server and store the second device information in the data storage memory, and to, in a case where the slave function is set, send the first device information to the second data server in which the master function is set, and in the case where the master function is set, the controller:
stores connection configuration information indicating a first connection relationship between the first data server and the first device and a second connection relationship between the second data server and the second device; and
in response to receiving, from the client, a data collection request that is a request for data collection, selects the first device information or the second device information based on the data collection request and the connection configuration information and sends the device information selected to the client.

* * * * *